(12) United States Patent
Hilleli et al.

(10) Patent No.: US 11,062,270 B2
(45) Date of Patent: Jul. 13, 2021

(54) GENERATING ENRICHED ACTION ITEMS

(71) Applicant: MICROSOFT TECHNOLOGY LICENSING, LLC, Redmond, WA (US)

(72) Inventors: Sagi Hilleli, Tel Aviv (IL); Tomer Hermelin, Tel Aviv (IL); Ido Priness, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/736,527

(22) Filed: Jan. 7, 2020

(65) Prior Publication Data

US 2021/0099317 A1 Apr. 1, 2021

Related U.S. Application Data

(60) Provisional application No. 62/909,063, filed on Oct. 1, 2019.

(51) Int. Cl.
*G06Q 10/10* (2012.01)
*H04L 12/18* (2006.01)
(Continued)

(52) U.S. Cl.
CPC ......... *G06Q 10/1093* (2013.01); *G06F 40/30* (2020.01); *G06N 3/008* (2013.01);
(Continued)

(58) Field of Classification Search
CPC ............ G06Q 10/1093; H04L 12/1818; H04L 12/1822; G06N 3/006; G06N 3/008
See application file for complete search history.

(56) References Cited

U.S. PATENT DOCUMENTS

| 2010/0023319 A1 | 1/2010 | Bikel et al. |
| 2015/0121216 A1* | 4/2015 | Brown ................... G06N 3/008 715/707 |
| 2017/0310716 A1* | 10/2017 | Lopez Venegas .......................... G06Q 10/1093 |

OTHER PUBLICATIONS

"State-of-the-art AI Solutions: (1) Google BERT, an AI Model that Understands Language Better than Humans", Retrieved From: https://medium.com/ai-network/state-of-the-art-ai-solutions-1-google-bert-an-ai-model-that-understands-language-better-than-92c74bb64c, Feb. 1, 2019, 10 Pages.

(Continued)

*Primary Examiner* — Kyung H Shin
(74) *Attorney, Agent, or Firm* — Shook, Hardy & Bacon L.L.P.

(57) ABSTRACT

Computerized systems are provided for automatically determining and providing enriched action items of an event, such as a meeting. Action items first may be determined and then enhanced or clarified in order to be more understandable by automatically modifying or supplementing the action item based on contextual information, such as related meeting discussion. Action items may be further enhanced through clarification by determining boundaries of their occurrence(s) so that extraneous content not related to the action items or not helpful for user understanding is deemphasized or excluded from presentation to the user. Some embodiments comprise an intelligent graphical user interface with functionality for receiving user feedback. The feedback can be employed to reconfigure the logic, such as machine learning models, utilized to determine the enriched action items to improve accuracy.

20 Claims, 14 Drawing Sheets

(51) Int. Cl.
  *G06F 40/30* (2020.01)
  *G06N 20/00* (2019.01)
  *G06N 3/00* (2006.01)

(52) U.S. Cl.
  CPC ......... *G06N 20/00* (2019.01); *H04L 12/1822* (2013.01); *H04L 12/1831* (2013.01); *G06N 3/006* (2013.01); *H04L 12/1818* (2013.01)

(56) References Cited

OTHER PUBLICATIONS

Mieskes, et al., "Improving Extractive Dialogue Summarization by Utilizing Human Feedback", In Journal of Artificial Intelligence and Applications, Feb. 12, 2007, 6 Pages.

"International Search Report and Written Opinion Issued in PCT Application No. PCT/US20/040204", dated Sep. 14, 2020, 13 Pages.

Sheshadri, Suhas, "Identifying Action Related Dialogue Acts in Meetings: Research into Identifying Action Items, Decisions, and Ideas from Multi-party Meeting Transcripts", In Degree Project in Computer Science and Engineering, KTH Royal Institute of Technology, School of Electrical Engineering and Computer Science, Sep. 19, 2019, 74 Pages.

\* cited by examiner

500

---

📞 KELLY SIMPSON – DEMO FOLLOW UP
CALL TIME 1MIN 27SEC
2:54 PM – MARCH 2, 2019

CONVERSATION | RELATED OPPORTUNITY

▼ ( ACTION ITEM (1) ) ( KEYWORDS (4) ) ( TRACKED KEYWORDS (4) )
( BRANDS (4) ) ( COMPETITORS (4) )

---

(KS) KELLY SIMPSON
00:00:00
HELLO (👤) LYDIA BAUER
00:00:03
HELLO THIS IS ERIC FROM CONTOSO, HOW ARE YA?

(KS) KELLY SIMPSON
00:00:11
GOOD, HOW ARE YOU?

(👤) LYDIA BAUER                                  📄 🗑
00:00:14
THANKS FOR YOUR TIME, I WILL SEND YOU THE DOCUMENT FOR SIGNATURE BY TOMORROW MORNING (KS) KELLY SIMPSON
00:00:23
OK (👤) LYDIA BAUER
00:00:26
ALRIGHT! I PULLED UP YOUR INFORMATION ON OUR SYSTEM AND WANTED TO CHECK IF YOU ARE INTERESTED IN OUT LASTED 3D PRINTER OFFERING AND ITS SPECIFICATIONS?

(KS) KELLY SIMPSON
00:00:33
NO. WE ALREADY USE XYZ PRINTER AND NORTHWIND 3D THAT WORKS JUST FINE.

(👤) LYDIA BAUER                                  📄 🗑
00:00:38
OK WELL, WHAT I CAN DO IS I CAN SEND YOU AN EMAIL WITH MY CONTACT INFORMATION WHEN YOUR CLIENT DOES HAVE QUESTIONS THAT YOU'RE NOT QUITE SURE HOW TO ANSWER ~505

(👤) LYDIA BAUER
00:00:45
OUR NEW OFFERING IS A CLOSED FRAME, WITH 1 EXTRUDER AND USES FUSED FILAMENT FABRICATION. ARE YOU INTERESTED IN KNOWING MORE ABOUT THIS OFFERING?

(KS) KELLY SIMPSON
00:00:55
HMM MAYBE LATER (👤) LYDIA BAUER
00:00:59
YOU CAN TRY ATTENDING OUR UPCOMING EVENT DURING WHICH WE WILL HAVE A LIVE DEMONSTRATION. ~503

(KS) KELLY SIMPSON
00:01:01
NOT RIGHT NOW. MAYBE A FEW MONTHS LATER. ~501

GENERATING ENRICHED ACTION ITEMS

CROSS-REFERENCE TO RELATED APPLICATIONS

This application claims the benefit of U.S. Provisional Application No. 62/909,063, titled "Generating Enriched Action Items," filed Oct. 1, 2019, which is hereby expressly incorporated by reference in its entirety.

BACKGROUND

Computer-implemented technologies can assist users in organizing and completing tasks, and in particular, performing action items resulting from events, such as meetings. For example, some technologies, such as task lists or to-do lists applications, are configured to receive manual input from users, such as meeting notes, the topic of a meeting, or date of the meeting, and store, in computer memory, the input so that the user can refer back to the information in a static graphically displayed format. However, in addition to requiring manual input from users, the stored information and the user interface functionality of these technologies are limited. Generally, such solutions do not provide functionality for intelligently presenting action items to a user, among other things. Moreover, advances in computing technology and the increased prevalence of modern computing devices have resulted in a dramatic increase in data available regarding meetings or events. But the conventional solutions have not kept pace with these advances and have failed to capitalize on the available data, or provide robust functionality in order to address these new challenges.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Aspects of this disclosure relate to computerized systems for automatically determining and presenting enriched action items of an event, such as a meeting. An enriched action item may include an indication of the action item and related meeting content or contextual data useful for understanding the action item, and which may be personalized to a specific user, such as a meeting attendee. In particular, action items may be determined and then enhanced or clarified in order to be more understandable. For instance, some embodiments comprise automatically modifying or supplementing an action item based on contextual information, such as the meeting discussion related to the action item, which may occur throughout the meeting or in previous meetings, and/or external data, which may be located on user devices of event attendees or stored on a company server in the cloud, for example.

Additionally, action items may be automatically clarified by determining boundaries of their occurrence(s) in a meeting dialog so that extraneous content not related to the action items or not helpful for user understanding is deemphasized or excluded from presentation to the user. For instance, action items are often embedded or surrounded by other, unrelated information or by non-action item words and character sequences in a transcription of an event. Accordingly, some aspects of the present disclosure automatically detect and highlight, extract, or otherwise mark event content in order to indicate the specific words or character sequences that are part of an action item.

In some embodiments, an intelligent graphical user interface may be provided that includes functionality to improve the user experience, such as features that allow the user to provide feedback indicating whether or not an item presented is in fact an action item. Based on this feedback, logic or machine learning models used to determine the enriched action items can be retrained or updated so that future enriched action items determined and presented to a user are more accurate.

BRIEF DESCRIPTION OF THE DRAWINGS

Aspects of the disclosure are described in detail below with reference to the attached drawing figures, wherein:

FIG. 5A illustrates an example screenshot indicating content of a meeting event, which may be utilized for determining an action item in accordance with an embodiment;

FIG. 5C illustrates an example screenshot indicating various other user interface features related to presenting action items to a user, in accordance with an embodiment;

DETAILED DESCRIPTION

Figure 1:
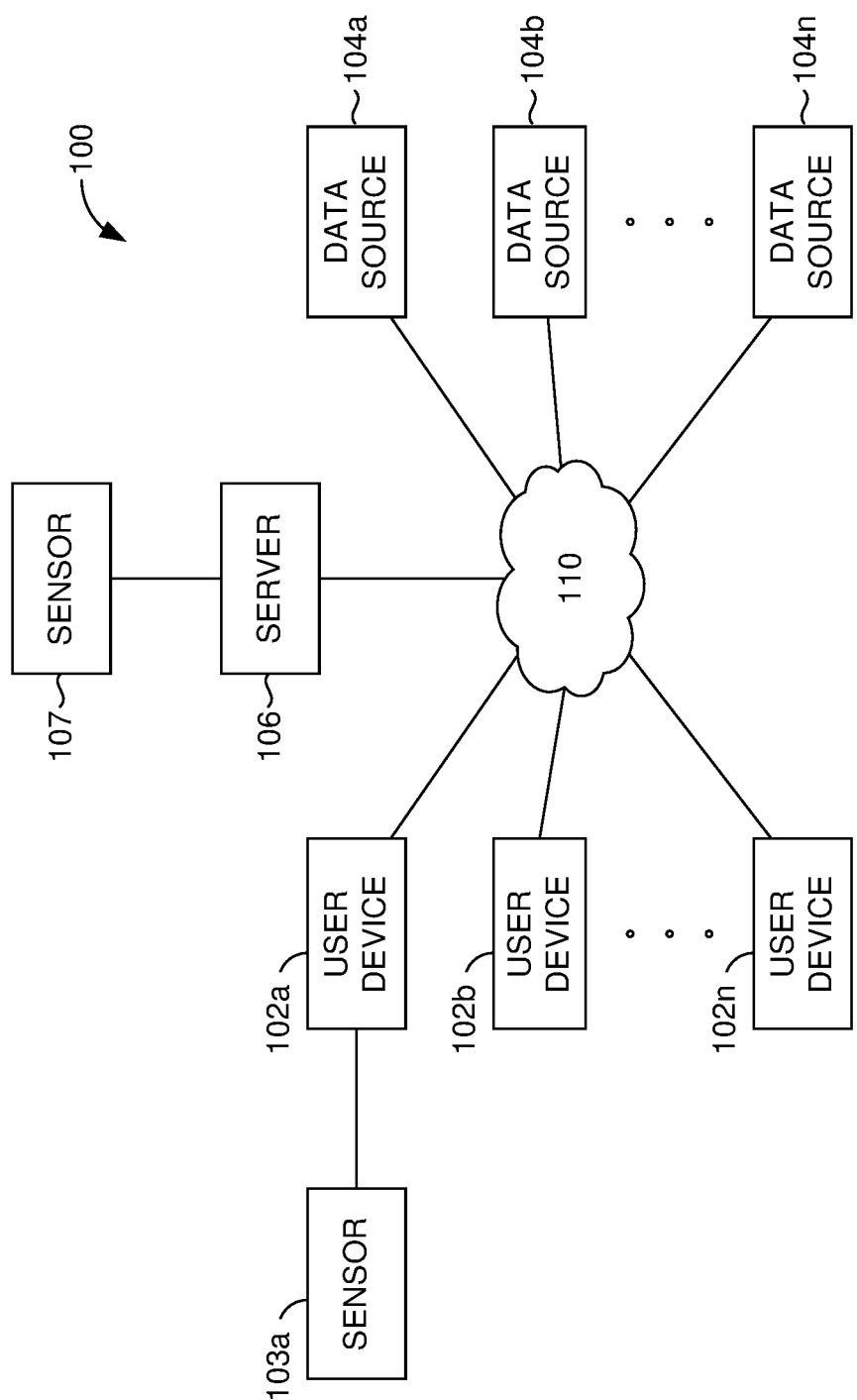
FIG. 1 is a block diagram of an exemplary computing environment suitable for use in implementing an embodiment of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Certain aspects of this disclosure automatically and intelligently determining and presenting enriched action items of an event (e.g., a meeting, an interactive workshop, an informal gathering, and the like.). An "action item" as described herein may comprise a task indicated in the event that is requested to be completed to further a certain goal or purpose associated with the event. An action item in various instances may be issued via a command or other request by a person to have another person(s) (or themselves) perform some action. In an illustrative example of an action item, during a meeting regarding the development of a certain computer application, a person may say, "Bob, can you perform a round of debugging on the app today?," which is an action item for Bob to perform a debugging action today in order to have the application ready for deployment. An "enriched" action item may include an indication of the action item and related meeting content or contextual information useful for understanding the action item, and which may be personalized to a specific user, such as a meeting attendee. In particular, action items may be determined and then enhanced or clarified in order to be more understandable. For example, an action item may read "you do it next week ok?" The action item may be enriched by clarifying that "you" refers to John, a participant of the meeting, and that "it" refers to the specific task of "project X debug project" based on past conversations stored on user devices or servers.

Manual note taking or manual computer user input and CPU processing for meetings or other events is time consuming and, in many cases, important action items are missed, incorrectly identified, or unclear in some way. Action items can be missed for a variety of reasons, such as lack of attentiveness, confusion as to what the action item is, and miscommunication, among other things. There are many different ways people talk and interact with others, which may cause action items to not be identified or unclear. Action items from events are often incomplete in that they lack important contextual data needed to understand an action item. For example, action item candidates can have missing information, such as information about the person responsible for completing the action item, the due date of the action item, the speaker of the action item, or information about the particular task associated with the action item. Event content, such as the dialog of a meeting, tends to be fragmented with various missing parts making it unclear what an action item is really referring to. For example, a phrase uttered in a meeting may not include the context, such as the date the action item is due, who is speaking, who the action item is to be completed by, and what the action item clearly is. Further, action items can be embedded in various other text making it difficult to identify what the actual action items are. For example, a sentence may read, "I will send the file tomorrow and you can do with it whatever you want." Users and conventional technologies have difficulty in identifying and presenting the portions of this sentence or other sentences or character sequences that are action items.

Various aspects of the present disclosure make up these deficiencies by automatically modifying or supplementing an action item based on contextual data, such as the meeting discussion related to the action item, which may occur throughout the meeting or in previous meetings, and/or external data. This contextual data may be useful for understanding the action item, and may be personalized to a specific user, such as a meeting attendee. In particular, action items may be automatically determined and enhanced or clarified in order to be more understandable. Various aspects of the present disclosure may determine clarity of action item candidates in order to display action items.

"Contextual data" in some embodiments may represent event context that is uttered or otherwise inputted (e.g., typed, emailed/communicated, or the like) before and/or after the action item candidate was uttered/inputted. "Event context" can comprise or include one or more portions (e.g., sentences or time sequences) of an audio or written transcript of all (or some of the) dialogue or utterances (e.g., conversations, questions, laughing, action items) within an event that represent the event content. Accordingly, for instance, for the action item "I will do it," the sentence right before this phrase in a transcript may have been, "John, will you be able to meet the model design deadline?" This event context contextual data provides a strong inference that John is the speaker and person responsible for the "I will do it" action item and that the "it" refers to the due date of the action item. Using this same illustration, a sentence directly after the action item candidate in a transcript may be, "ok good, I look forward to hearing about it next Friday." This context may indicate that "next Friday" is the due date of the model design action item candidate. Subsequently, in some embodiments, a user interface or other graphically displayed format may indicate the action item candidate and/or tags that indicate who is saying/receiving the action item candidate, when the due date is, and/or what the action item is. For example, using the illustration above, the final displayed action item may be, "[John] will [finish the model design by next Friday]." In this way, the finally presented action items can add, remove, replace, or otherwise change originally presented action item candidates with other character sequences.

Additionally or alternatively, contextual data can refer to any remote or "external context" obtained, which is not directly part of the transcript or content of the actual event (the event context). For example, external context can be data retrieved from a user device (e.g., via a calendaring tool plugin, text, social media, or other application), sensor (e.g., biometric sensor, geolocation sensor), one or more servers, and/or other remote data stores, such as a database. Such external context can be used as one or more signals to determine information such as the date the action item is due, who is speaking, who the action item is to be completed by, and/or what the action item clearly is. In an illustration, using the example above, for an event transcript that includes the action item, "I will do it," the event context may not indicate who said this, but a text message from a meeting participant's phone may read, "John, we are having a meeting in 1 week to discuss the model design that you are responsible for, can you be there?" This external context can be a strong signal that the owner and speaker of the action item candidate is John.

By way of example, an initial action item candidate determined by an embodiment of the present disclosure may read, "I will do it." Using natural language processing and/or machine learning components as described herein, it may be determined that this sentence is unclear (e.g., that it is below a threshold clarity score). This may occur, for example, by determining that no names and only pronouns exist within the sentence and/or that no date is identified. Accordingly, it may be initially unclear: who is saying or otherwise inputting this sentence, what "it" refers to, when "it" will be completed by, and who is to complete the action item. In various embodiments, in response to determining that this candidate is below a clarity score, missing data can be determined from contextual data, as described above.

Various embodiments of the present disclosure automatically modify or supplement an action item based on contextual data by determining and presenting the quantity of contextual data needed for an action item to be clear. This determination can be based on generating a clarity score. A "clarity score" is a score that is indicative of how clear a particular action item is based on one or more factors, such as "who" stated the office action, "when" the action item is due, and the like. If a clarity score of a candidate action item is below a threshold, for example, then more context is presented relative to the candidate action item having a score that is above a threshold. In effect, the clarity score in some embodiments has inverse relationship with the amount of contextual data that is presented. The higher the clarity score, the lower the amount of contextual data is provided to, for example, a user interface. Conversely, in some embodiments, the lower the clarity score, the higher amount of contextual data is provided. For example, the action item candidate "I will work on it" may have a clarity score below a threshold. Consequently, a threshold quantity of text in a transcript before and/or after this action item candidate may additionally be presented to a user interface. In this way, users can scroll through or otherwise view more transcript text to help identify associated information (e.g., who stated the action item candidate, when the due date is, who is responsible for completing the action item).

In various embodiments of the present disclosure, action items are automatically clarified by determining boundaries of their occurrence(s) in a meeting dialog so that extraneous content not related to the action items or not helpful for user understanding is deemphasized or excluded from presentation to the user. As described above, various technologies and events contain embedded action items among other non-related or non-action items text. This can make it difficult to spot what an action item is. However, some embodiments highlight or otherwise determine what an action item is, even if it is embedded among other non-action item text. For example, using the illustration above, a portion of a transcript may read, "I will send the file tomorrow and you can do with it whatever you want." Various embodiments of the present disclosure can present the following example displayed text, "I will send the file tomorrow and you can do with it whatever you want," which is indicative of highlighting or otherwise presenting the action item "I will send the file tomorrow" so that it is clear what the action item is and what the action item is not. In this example, for instance, the text that is not the action item is not bolded text, while the text that is the action item is bolded text.

In some embodiments, an intelligent graphical user interface may be provided that includes functionality to improve the user experience, such as features that allow the user to provide feedback indicating whether or not an item presented is in fact an action item. For example, there can be logic that receives feedback from a user if a user does not understand what an action item is or other information (e.g., speaker, owner) associated with the action item. Such feedback can be used, for example, by machine learning models as additional training data input to improve predictions. For example, an action item may be presented on a user interface and the user may be able to select a button or other GUI element indicative of the action item not being an action item. This may then be provided as training or tuning data to a machine learning system so that this same action item is not presented as an action item in future sessions. Alternatively or additionally, the user may be able to view a list of action items, as opposed to an entire event transcript that contains content that is not an action item. Alternatively or additionally, the user can select more or less event context to be presented.

Existing technologies have various functionality shortcomings. For example, various event and meeting technologies only manually receive static data (e.g., name of a meeting, other notes) and at best may display meeting transcripts with unclear action items and unclear associated data. For instance, in many computer-implemented chats, meeting-based web applications, meeting-based apps, or transcripts, it is often unclear as to the person who stated an action item, the person responsible for completing an action item, the due date of action items and the like. These technologies do not automatically determine action items and action item clarity based on particular rules. Rather, these technologies have historically required manual input of users without regard to any intelligence or rules that provide the specific functionality described herein to generate enriched action items.

Existing applications or user interface technologies are particularly deficient in terms of their functionality. Conventional event solutions, such as chatrooms or user interfaces of meeting applications simply display all of the text of an entire event that is inputted by users. This forces the tedious user task of manually scrolling through threads or windows to see what action items exist or drilling through various layers to obtain any relevant information. This also forces users to determine missing information, such as who is the person to complete the action item, the date of the action item, who is the speaker, and the like. This can cause inaccuracies because of human error and this determination is very time consuming. Various embodiments of the present disclosure improve these display technologies because they can, for example, display only action items (as opposed to an entire event transcript) via a single user interface or reduce drilling down on a user interface. Additionally, embodiments allow other contextual information to be presented or determined, such as who the speaker is, who needs to complete the action item, the due date, and the like. Accordingly, embodiments improve existing technologies by generating enriched action items, which is something technologies do not do today.

In another example of a functionality shortcoming, some technologies, such as virtual assistants (e.g., smart speakers) fail to clarify information associated with action items (e.g., who speakers are, due date of action items, who needs to perform action items). While these technologies can generally process natural language requests and perform key word recognition, these technologies cannot generally determine action items and use contextual data to clarify action items. While some speech-to-text technologies can parse text to simply output the text, they fail to clarify action items, such as due dates of action items and persons responsible for completing action items. Various embodiments improve these virtual assistants because they can clarify action items using contextual data.

Existing technologies are also inefficient in terms of computer resource consumption (e.g., CPU, memory, I/O, network latency). For example, existing technologies require entire transcripts of events to be either transmitted over a network to a user device and presented to a user interface or stored to memory devices so that the user can manually parse out the relevant information within the data. Such transcripts may include input, such as the names of meeting participants, the time of the meeting, the name of the meeting, and all of the meeting content. This can increase storage device I/O (e.g., excess physical read/write head movements on non-volatile disk) or network latency because each time a user inputs these data, requests have to repetitively reach out to the storage device to perform read/write operations, which is time consuming, error prone, and can eventually wear on components, such as a read/write head. Additionally, in session or network-based web applications, each user input may require packet generation costs (e.g., input header information) for network protocols (e.g., TCP/IP), which may increase network latency each time the user input is transmitted over a network. Additionally, presenting user interfaces, storing, or transmitting entire transcripts of events can consume an unnecessary amount of memory.

Various embodiments of the present disclosure improve these technologies by improving computing resource consumption of computing devices. For example, some aspects only present, transmit, or store action items of events (and perhaps a small quantity of metadata and/or contextual data). For example, after determining action items, embodiments can transmit only the action items (as opposed to the entire meeting transcript), over a computer network to the user device of the user who is the "owner" or party responsible for carrying out the action items. In this way, packet generation costs are reduced because only action items are transmitted over a network, which in some cases allows more bits to be transmitted over the network. In another example, a user interface can be provided, which only includes action items or only action items are recorded, as opposed to entire transcripts of a meeting. In this way, memory storage is optimized and there are fewer I/O operations.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 11 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
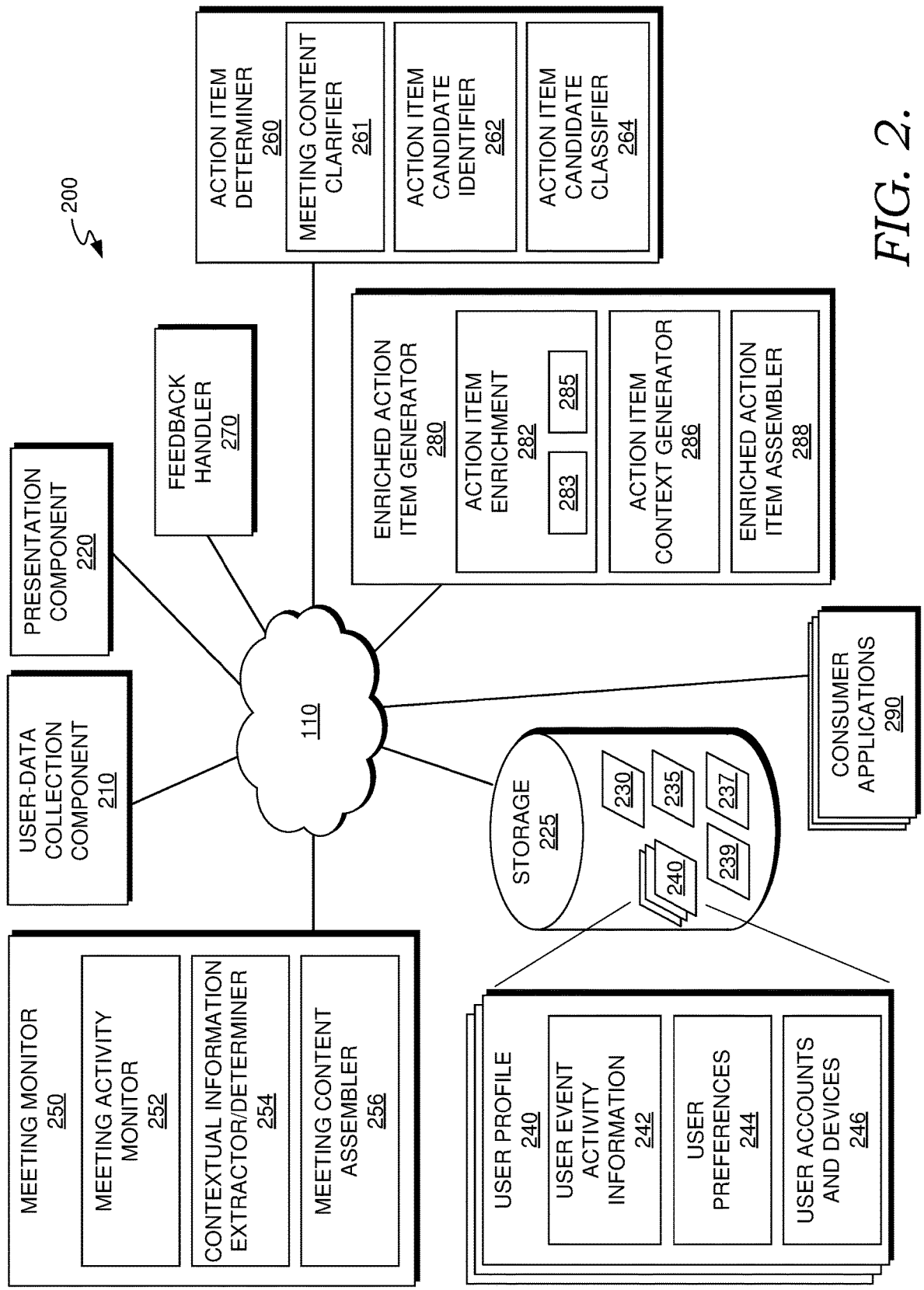
FIG. 2 is a block diagram illustrating an example system architecture for generating and presenting enriched action items, in accordance with an embodiment of the present disclosure.

Operating environment 100 can be utilized to implement one or more of the components of the action item capturing system 200, described in FIG. 2, including components for automatic action item extraction. Operating environment 100 also can be utilized for implementing aspects of process flow 900 (or 1000), described in FIG. 9 (or FIG. 10). Referring now to FIG. 2, with FIG. 1, a block diagram is provided showing aspects of an example computing system architecture suitable for implementing an embodiment of the disclosure and designated generally as action item presenting system 200. The action item presenting system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, meeting monitor 250, action item determiner 260, enriched action item generator 280, feedback handler 270, user-data collection component 210, presentation component 220, and storage 225. In some embodiments system 200 may include or operate with one or more consumer applications 290. These components may be embodied as a set of compiled computer instructions or functions, program modules, computer software services, or an arrangement of processes carried out on one or more computer systems, such as computing device 1100 described in connection to FIG. 11 for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for the meeting monitor 250 and/or the action item determiner 260. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS)

data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 210 from one or more sensors and/or computing devices associated with a user. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (i.e., speech-to-text), or aspects of spoken language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal could be from a smartphone, a home-sensor device, a smart speaker, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed.

Continuing with FIG. 2, example system 200 includes a meeting monitor 250. Meeting monitor 250 is generally responsible for determining and/or detecting meeting features from online meetings and/or in-person meetings and making the meeting features available to the other components of the system 200. For example, such monitored activity can be meeting location (e.g., as determined by geo-location of user devices), topic of the meeting, invitees of the meeting, whether the meeting is recurring, related deadlines, projects and the like. In some aspects, meeting monitor 250 determines and provides a set of meeting features (such as described below), for a particular meeting, and for each user associated with the meeting. In some aspects, the meeting may be a past (or historic) meeting or a current meeting. Further, it should be appreciated that the meeting monitor 250 may be responsible for monitoring any number of meetings, for example, each online meeting associated with the system 200. Accordingly, the features corresponding to the online meetings determined by meeting monitor 250 may be used to analyze a plurality of meetings and determine corresponding patterns.

In some embodiments, the input into the meeting monitor 250 is sensor data and/or user device data of one or more users at an event and/or contextual information from a meeting invite and/or email or other device activity of users at the meeting. In some embodiments, this includes user data collected by the user-data collection component 210 (which can be accessible via the user profile 240).

The meeting activity monitor 252 monitors user activity via one or more sensors, (e.g., microphones, video), devices, chats, presented content, and the like. In some embodiments, the meeting activity monitor 252 outputs transcripts or activity that happens during a meeting. For example, activity or content may be timestamped or otherwise correlated with meeting transcripts. In an illustrative example, the meeting activity monitor 252 may indicate a clock time at which the meeting begins and ends. In some embodiments, the meeting activity monitor 252 monitors user activity information from multiple user devices associated with the user and/or from cloud-based services associated with the user (such as email, calendars, social media, or similar information sources), and which may include contextual data associated with transcripts or content of an event. For example, an email may detail conversations between two participants that provide context to a meeting transcript by describing details of the meetings, such as purpose of the meeting. The meeting activity monitor 252 may determine current or near-real-time user activity information and may also determine historical user activity information, in some embodiments, which may be determined based on gathering observations of user activity over time, accessing user logs of past activity (such as browsing history, for example). Further, in some embodiments, the meeting activity monitor may determine user activity (which may include historical activity) from other similar users (i.e., crowdsourcing).

In some embodiments, using contextual information related to user devices, a user device may be identified by the meeting activity monitor 252 by detecting and analyzing characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 244 of user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

The user profile 240 may include learned information about meeting participants or attendees, personal preferences of meeting attendees, and the like. The user profile 240 may include user event activity information 242. This may include indications of when attendees or speakers tend to mention action items (e.g., that is identified via patterns in prior meetings). For example, a particular attendee may always state action items during the last 5 minutes of a meeting. This information can be used to make predictions throughout a meeting to determine whether or not statements are action items. The user profile 240 may also include how attendees or speakers mention action items. For example, historical meeting events may indicate that a particular user always states "let's mark it," after the end of each action item to make sure action items are marked as importance in notes otherwise for completion.

In some embodiments, user event activity information 242 corresponds to identified patterns of historical behavior of one or more participants of an event. Such patterns may be or include: patterns in the way participants talk (e.g., participant A always makes jokes even when issuing a command, making it less likely that a candidate is an action item), tendency to mention action items at a specific time or time window of an event, pattern of never being the owner of or issuing any action items, pattern of always being the owner of or issuing action items, patterns in the way people phrase action items or interact with others (e.g., person A who is a manager always says, "homework assignment number [x] . . . " before an action item is a signal that a sentence thereafter is an action item), user's language and style, conversation history as previous communication (e.g., chats, e-mails, and docs) between participants, and the like. Historical patterns can be used to predict whether candidate action items are indeed action items. For example, if the conversation history between two participants revealed that the next upcoming meeting Y would be where they decided a location for an upcoming event Z, the phrase "Ok John, let's have it at Glendale" at meeting Y may be determined to be an action item based at least in part on the conversation history regarding the event and event location. In some embodiments, the patterns identified as the participant behavior history 346 is determined by one or more machine learning models (e.g., Bayesian graphs, random forest, linear regression, and the like).

The user profile 240 can include user preferences 244, which generally includes user settings or preferences associated with meeting monitor 250. By way of example and not limitation, such settings may include user preferences about specific events (and related information) that the user desires be explicitly monitored or not monitored or categories of events to be monitored or not monitored, crowdsourcing preferences, such as whether to use crowdsourced information, or whether the user's event information may be shared as crowdsourcing data; preferences about which events consumers may consume the user's event pattern information; and thresholds, and/or notification preferences, as described herein.

In some embodiments, the user profile 240 includes participant roles of each participant in an event. Participant role can be used as a signal to help determine whether an action item candidate is indeed an action item. This is because certain statements are more likely or less likely to be action items depending on the role of the participant who made the statement. For example, the statement "we should create a different design for this customer" may be an action item if it is mentioned by a senior or managerial engineer, whereas it would not necessarily be an action item if a new employee made the same statement because typical employment structures require action items to either be stated by authority figures or be approved by authority figures.

In some embodiments, the user profile 240 includes alternative or additional information, such as age of participants, family members of participants and associated information, address of participants, and the like that are used to help determine whether candidate action items are indeed action items. For example, if it is known that speaker A has a kid Jane Doe in school, and speaker A says "I have to pick up Jane Doe today," this may selectively not be chosen to be an action item based on the family member data.

The contextual information extractor/determiner 254 is generally responsible for determining contextual information about an event (e.g., external context). This information may be metadata or other data that is not the actual meeting content or payload itself, but describes related information. For example, contextual information may include who is present or invited to a meeting, the topic of the meeting, whether the meeting is recurring or not recurring, the location of the meeting, the date of the meeting, the relationship between other projects or other meetings, information about invited or actual attendees of the meeting (e.g., company role, whether participants are from the same company, and the like).

The meeting content assembler 256 is generally responsible for receiving event content and related contextual information and generates an enriched meeting-activity timeline. In some embodiments, this timeline is a transcript that includes tags and/or other associated content. For example, the timeline can include structured data (e.g., a database) that includes records, where each record includes the timeline of each conversation and a timestamp indicating when the conversation started/stopped. The record can alternatively or additionally include contextual information or metadata, such as information about participants of the event or the event itself (e.g., topic of the event, files, slides, or any information in the user profile 240). The enriched meeting-activity timeline can be the output of the meeting monitor 250.

The action item determiner 260 is generally responsible for identifying likely action items from event content. In some embodiments, the input includes the output of the meeting monitor 250 (e.g., user data and meeting-related data from: sensors (microphones, video, user activity, and the like), the user-data collection component 210, and from user profile 240 of users). In some embodiments, the output of the action item determiner 260 is a list of likely action items and related corresponding information, such as contextual data, relevant files, who the action item is attributed to or who has to complete the action item, the date, and the like. In some embodiments, the output of the action item determiner 260 includes a structured data record (e.g., a database record) that includes various attributes, such as action item name, attribution (who has to complete the action item), action item category/type, related files, and/or content to be provided to remind the user to complete an action item.

The meeting content clarifier 261 is generally responsible for structuring or cleaning meeting content (e.g., the transcription and contextual data). For example, a sentence can be tagged with Part-Of-Speech (POS) identifiers, words can be removed, replaced, and added. In some embodiments, the meeting content clarifier 261 parses or tokenizes event content and/or other external information (e.g., information received by the user-data collection component 210) and re-structures the information. In some embodiments, the event content is or includes documents or transcripts of the order and content of everything that was said in an event written in natural language. For example, the event content can be a written transcript of everything that was said or uttered during an entire duration of a meeting. In some embodiments, the event content can alternatively or additionally include audio content of everything that was said during an event. In some embodiments, the meeting content clarifier 261 processes event content in near-real time (e.g., as each statement is stated during a meeting or shortly thereafter each statement is stated). Alternatively or additionally, in some embodiments, the meeting-content clarifier processes event content after each event or meeting has concluded.

In some embodiments, the meeting content clarifier 261 tokenizes and breaks character sequences (e.g., sentences, words) from the content and joins or concatenates other character sequences (e.g., semantically similar words) and/or tags (e.g., part-of-speech) to the tokenized character sequences. In some embodiments, the joined character sequences are a part of a natural language processing (NLP) component or library where each content is parsed into its words and some or each of the words are tagged with a part-of-speech identifier.

"Tokenization" or parsing in various embodiments corresponds to a computer-implemented process that segments the content into words, sentences, symbols, character sequence, and/or other elements of the content. "Syntax" or syntactic properties refers to the structure of character sequences of the content (as opposed to the semantics or meaning), such as the structure of a sentence. This can include a set of rules for analyzing a message, such as word and/or POS order. For example, for the sentence "the girl jumped happily", the syntax may correspond to a word order where the structure is subject-verb-adverb (or subject, verb, object, etc.). In various embodiments, the POS of a message element is tagged.

In some embodiments, NLP derives semantic and syntactic content of semi-structured or unstructured data (e.g., data in image files, data in blogs, posts, websites, text descriptions of classifier models). This is in contrast to analyzing "structured" data, such as data in a database. NLP can be configured to parse content to determine semantic context (e.g., meaning of words by analyzing each word in the content against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, the meeting content clarifier 261 removes redundant or duplicated character sequences from the content. This takes into account meeting participants who stutter, stammer, mumble, accidentally say the same things, or otherwise provide redundant or repetitive data. For example, a meeting participant may say, "I will . . . [pause because someone interjects] . . . Ok I will send the mmm file." In this example, the meeting content clarifier 261 may remove the "I will" phrase from the character sequence because it is redundant (e.g., it has already been stated).

In some embodiments, the meeting content clarifier 261 replaces, removes, and/or adds words or sets of words to character sequences in the content to make the content easier for processing. In some embodiments, this component uses semantic and syntactic analysis described above with respect to NLP. Alternatively or additionally, in some embodiments this component uses word embedding models (e.g., word-2-Vec, GloVe, and the like) to determine semantically similar words. For example, the meeting-content clarifier can modify the phrase "I'm going to make sure you aren't blocked," to "[person] [will] make sure that [person] [is not] blocked." Accordingly, the sequence structure component 218 can determine that "I'm going to" is semantically similar to "I will" and that "aren't" is semantically similar to "is not" and make the corresponding replacements. Moreover, the sequence structure component 218 can determine that a "person" is speaking or is the subject and/or object of the sentence.

In some embodiments, the action item candidate identifier 262 can determine candidates based on the syntax or other structure of content (e.g., whether a sentence is a command). In some embodiments, the action item candidate identifier 262 excludes content or action item candidates based on candidates that will likely be finished during the meeting or that are private commands or requests unrelated or are not part of an event. For example, the statement "I will finish talking about X in the next slide," may be excluded as an action item because it is likely to be finished during a meeting. In some embodiments, the action item candidate identifier 262 determines which portions of the content are candidates to become action items. In some embodiments, this occurs after or in response to the processing by the meeting content clarifier 261. The action item candidate identifier 262 identifies patterns or syntactic relationships in character sequences in content to define the boundaries or cutoffs for action items. For example, using the illustration above, after the natural language sequence normalizer determines a character sequence to be "person will make sure that person is not blocked," it can be identified by the candidate identifier as a candidate for further processing. In some embodiments, the action item candidate identifier 262 identifies linguistic or natural breaks in the content, such as periods, semi-colons, when commands are issued, and the like to determine that the content between these characters or commands are candidates for further processing. For example, if event content had a total of 4 sentences, and 3 of the 4 sentences were commands, the candidate identifier 223 identifies the 3 sentence commands as individual action item candidates for further processing.

In some embodiments, the action item candidate identifier 262 uses action item identification logic 230 to identify action item candidates. Action item identification logic 230 can include pattern recognition logic. Pattern recognition logic may include rules, associations, conditions, prediction and/or classification models, or pattern inference algorithms. The action item identification logic 230 can take many different forms depending on the particular response activity pattern or the mechanism used to identify a response activity pattern, or identify feature similarity among observed response activity events to determine the pattern that corresponds to performing a task associated with a user command. For example, some embodiments of action item identification logic 230 may employ machine-learning mechanisms to determine feature similarity, or other statistical measures to determine the response activity events belonging to a set of example response actions that support the determined response activity pattern, as further described below. Event activity may be received from the meeting monitor 250 and information about identified similar features may be received from features the action item candidate identifier 262.

The action item candidate classifier 264 is generally responsible for classifying an action item candidate as either an action item or not an action item. In some embodiments, this component can use any suitable model or set of models or technique to make predictions, such as random forest models, deep neural networks, Bayesian networks, or any other suitable machine learning model. In some embodiments, where the model is supervised, for example, the labels or classification targets are whether a candidate is an action item or not. For example, in random forest embodiments, each leaf node may indicate whether a candidate is an action item or not, which is based on the decision at the branch and root nodes (e.g., based on the extracted values within the user profile 340 and contextual data).

In some embodiments, the action item candidate classifier 264 detects or classifies a written or audio transcript according to the type of meeting. For example, this component can classify whether the event is a broadcast meeting, a tutorial, a board meeting, and the like (e.g., based on the contextual data information). Alternatively or additionally, the action item candidate classifier 264 additionally or alternatively computes the probability that action items will exist within content based at least in part on the type of event and/or other information within the contextual data. In some embodiments, this probability is used for additional probabilities to indicate whether specific candidates are indeed action items. For example, if it was determined that an event is a tutorial or speaking engagement with little to no feedback or dialog between speaker and attendees, there may be a prediction that there is a low probability (e.g., low confidence level) that an event will contain action items. Accordingly, anything specifically stated or said during the event might automatically be weighted or otherwise scored toward low probability.

In some embodiments, the action item candidate classifier 264 uses a Naïve Bayes or other Bayesian network model to make its predictions. Naïve Bayes algorithms are a set of probabilistic algorithms that use probability theory and Bayes' Theorem to predict the tag of a text. For example, if an event name does not automatically provide the name or topic of a meeting, the event type detector 332 may use Naïve Bayes algorithms to infer or predict the topic or name of an event. In an illustrative example, the statement "let's do more rounds of tracing and debugging" may be tagged with "software performance engineering" or the like. A Bayesian network graph maps the relationships between nodes (e.g., events) in terms of probability. These graphs show how the occurrence of particular events influence the probability of other events occurring. Each node is also conditionally independent of its non-descendants. These graphs follow the underlying principle of Bayes' theorem, represented as:

$$P(A \mid B) = \frac{P(B \mid A)P(A)}{P(B)}, \quad \text{Equation 1}$$

where A and B are events and $P(B) \neq 0$. That is, the probability (P) of A given B=the probability of B given A multiplied by the probability of (A) all over the probability of B. The directed acyclic graph includes various nodes, directed edges, and conditional probability tables. For example, each node may represent a feature within contextual data associated with the event, such that the probabilities are interdependent, such as because there is a high probability that the event location is at X, there is a probability Y that the topic or event name 372 of the event is Z, and because of probability Y, there is probability T that participants 1, 2, and 3 will be at the meeting.

In some embodiments, the action item candidate classifier 264 classifies sections (e.g., action item candidates, paragraphs, sentences, pages, and the like) of content as concrete (high probability that the section is an action item) or descriptive (low probability that the section is an action item). This component can thus parse content and map, in memory, the sections as likely or not likely to be action items (e.g., based on syntax structure). For example, sentences or phrases without any commands or requests (e.g., sentences that are not imperative sentences), such as "item X was great for our customers," or "we had lots of fun at the last meeting," or "we made lots of progress since the last meeting," have a low probability of being action items. Conversely, sentences or phrases that are imperative sentences or otherwise include commands or requests are more likely to be action items. An imperative sentence is used to issue a command, make a request, or offer advice. Imperative sentences typically end in a period or exclamation point or have other syntactic properties, such as a subject, followed by a verb, then an object (e.g., "John [subject], please join [verb] in on the project [object]."). In some embodiments, this component can discern between action items and those that appear to be action items but are not based, for example, on syntactic properties and or history (e.g., the participant behavior history). For example, the statement, "you can press on it," may be tagged as not an action item based on a dictionary or other data structure that lists colloquial terms or phrases that are sayings, as opposed to action items.

In some embodiments, the action item candidate classifier 264 uses prediction models, such as a Hidden Markov Model (HMM). An HMM is a computing tool for representing probability distributions over sequences of observations. These tools model time series data. HMMs augment the Markov chain. The Markov chain is a model that provides insight about the probabilities of sequences of random variables, states, each of which take on values from a set of data. These data sets can be words, tags, symbols or the like. The assumption with Markov chains is that any prediction is based only on the current state, as opposed to states before the current state. States before the current state have no impact on the future state. In various cases, events of interest are hidden in that they cannot be observed directly. For example, POS tags are typically not observed in a text.

Rather, words themselves are directly observed and POS tags (the hidden state) are inferred.

An HMM allows the model to use both observed events and hidden events that are essentially causal factors in a probability algorithm. An HMM is represented by the following components: a set of N states $Q=q_1 q_2 \ldots q_N$, a transition probability matrix $AA=a_{11} \ldots a_{ij} \ldots a_{NN}$, each $a_{ij}$ representing the probability of moving from state i to state j, s.t. $\Sigma_{j=1}^{N} a_{ij}=1 \forall i$, a sequence of T observations $O=o_1 o_2 \ldots o_T$, each one drawn from a vocabulary $V=v_1, v_2, \ldots v_T$, a sequence of observation likelihoods $B=b_i(o_t)$, also called emission probabilities, each expressing the probability of an observation of being generated from a state i and an initial probability distribution $\pi=\pi_1 \pi_2 \ldots \pi_N$ over states. $\pi_i$ is the probability that the Markov chain will start in state i. Some states j may have $\pi_j=0$, meaning that they cannot be initial states.

The probability of a particular state depends only on the previous state, thus introducing the Markov Assumption: $P(q_i|q_1 \ldots q_{i-1})=P(q_i|q_{i-1})$. The probability of an output observation of depends only on the state the produced the observation $q_1$ and not on any other states or any other observations, thus leading to output independence $O(o_i|q_1 \ldots q_i \ldots, qr, o_1, \ldots, o_i, \ldots o_T)=P(o_i|q_i)$. This allows a component to state that given observations o (e.g., a sentence was in the form of a command, the type of meeting, or any other value within the contextual data), the algorithm can find the hidden sequence of Q states (e.g., whether or not a portion of content was likely an action item or not). In some embodiments, the action item classifier takes, as input, all the calculated features, and/or other character sequences or contextual data and classifies or otherwise makes a prediction whether each candidate action item is an action item or not an action item.

In an illustrative example of how the action item candidate classifier 264 makes predictions, first the meeting content clarifier 261 can take as input and entire transcript to restructure the transcript as described above. Responsively, the action item candidate identifier 262 can identify candidate action items based on sentence syntax, exclusion rules, and/or can extract various features from the user profile 240 or contextual data as described above. Responsively, the action item candidate classifier 264 can classify the event (e.g., via Naïve Bayes), determine the probability that sections or action item candidates in the transcript are action items or not (e.g., via an HMM), and then finally classify whether a candidate action item is indeed an action item. For example, the action item candidate classifier 264 can determine whether or not a candidate is an action item with a certain level of confidence based at least in part on the participant behavior history, the participant role, and the participant preferences of each participant in a particular meeting and/or any other data within the user profile 240 and other contextual data.

In some embodiments, the action item candidate classifier 264 uses a machine learning model, such as a deep learning classification neural network (e.g., a Convolutional Neural Network (CNN), Recurrent Neural Network (RNN), and Transformers). In certain embodiments, labels, categories, or target classifications can first be identified, such as "action item" or "not an action item." These labels, categories, or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem. For example, confidence levels obtained to detect action items can be used to detect non-action items. A new dataset is typically similar to original data set used for pre-training. Accordingly, the same weights can be used for extracting the features from the new dataset. In an illustrative example, an original data set may include a statement made by a meeting participant that is classified as an action item. It may also be the case that the participant makes this statement 95% of the time when issuing an action item. Accordingly, via transfer learning and for a new incoming data set, the user may not make this statement. Using the same weights, it can be inferred that the statement is not an action item.

The neural network can include a convolutional layer, a pooling layer, and a fully connected layer. The machine learning model neural network may be fed or receive as input the output provided by the meeting content clarifier 261, and/or the action item candidate identifier 262 at the convolutional layer in particular embodiments. Each input can be transformed into a 2-D input vector array of values, such as integers of ones and zeroes. Each value represents or describes a particular value of the input and the value's intensity. For instance, word or character sequence can be denoted with a one and other words or character sequence can be denoted with zeroes. The convolutional layer utilizes one or more filter maps, which each represent a feature (e.g., participant role 344) of the input. There may be various features of the input and thus there may be various linearly stacked filter maps for a given input. A filter map is also an array of values that represent sets of values and weights where a value is weighted higher when it matches a corresponding value (e.g., training data that indicates participant behavior history) or set of values in the corresponding section of the input. The convolution layer includes an algorithm that uses each filter map to scan or analyze each portion of the input. Accordingly, each value of each filter map is compared and matched up against a corresponding value in each section of the input and weighted according to similarity. In some embodiments, the convolutional layer performs linear functions or operations to arrive at the filter map by multiplying each value with its own value and then performing a summation function of each product, which is then divided by the total quantity of values in the input feature.

In particular embodiments, the pooling layer reduces the dimensionality or compresses each feature map by picking a window size (i.e., a quantity of dimensional values that will be analyzed in the feature map) and selecting the maximum value of all of the values in the feature map as the only output for the modified feature map. In some embodiments, the fully connected layer maps or votes for each value of each modified feature to each classification (i.e., whether or not the candidate is an "action item" or "not an action item"). The vote strength of each value is based on its weight or value score. The output is a score (e.g., a floating point value, where 1 is a 100% match) that indicates the probability that a given input or set of modified features fits within a particular defined class (is an action item or not an action item). For example, an input may include a set of text that states, "let's get this meeting started after I tell a joke . . . . Jake tell John to finish the product by Monday." The classification or label types may be "action item" or "not an action item." After the first character sequence "let's get this meeting started after I tell a joke . . . " is fed through each of the layers, the output may include a floating point value score for each classification type that indicates "action item: 0.21," and "not an action item: 0.90," which indicates that this character sequence has a 90% probability of not being an action item. Training or tuning can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen over time as more training inputs and baseline data sets are fed into the learning models so that classification can occur with higher prediction probabilities.

In some embodiments, the action item candidate classifier 264 classifies action items candidates based at least in part on the information retrieved by the meeting monitor 250, and/or the information in the user profile 240. For example, the action item candidate classifier 264 can receive contextual information from the contextual information determiner 254 that indicates the due date X of action item Y discussed prior to a current meeting. Then during a current meeting, managing participant John Doe may say, "okay, let's start doing Y beginning tomorrow." The action item candidate classifier 264 may then predict that Y is an action item based on the manager being the speaker and prior information that indicated Y being an action item and having a due date.

In some embodiments, the action item classifier uses logic 235. Logic 235 may include rules, associations, conditions, prediction and/or classification models, or pattern inference algorithms. Logic 235 can take many different forms depending on the particular response activity pattern or the mechanism used to identify a response activity pattern, or identify feature similarity among observed response activity events to determine the pattern that corresponds to performing a task associated with a user command. For example, some embodiments of logic 235 may employ machine-learning mechanisms to determine feature similarity, or other statistical measures to determine whether or not action item candidates are action items.

The enriched action item generator 280 is generally responsible for generating data that supplements and/or modifies action items so as to clarify and provide additional event context for action items. As illustrated in the example embodiment of system 200, the enriched action item generator 280 includes action item enrichment 282, action item context generator 286, and enriched action item assembler 288. The action item enrichment 282 is generally responsible for identifying the content of a specific action item and enriching the action item. For example, some embodiments of action item enrichment 282 identify the specific text that indicates the action items, and determines and/or clarifies data associated with the action item, such as owner, speaker, due date, or similar related information.

In some embodiments, action item enrichment 282 includes an action item boundary generator 283 and an action item clarifier 285. Action item boundary generator 283 is generally responsible for highlighting or otherwise defining action item boundaries (e.g., beginning and end words of action items) within a larger body of text to present. In some embodiments, the action item boundary generator 283 computes the beginning and/or end of action items for presentation, which is indicative of the character sequence boundaries. For example, embodiments may indicate that within the text, "I will send the file tomorrow and you can do with it whatever you want," the action item is "I will send." The word "I" may be defined as the beginning boundary for the action item and the word "tomorrow" may be defined as the end boundary such that the displayed action item text is "I will send the file tomorrow."

In some embodiments, the identifying of the beginning and/or end boundaries of action items includes using one or more models (e.g., deep neural networks (DNN)), such as CNNs, Recurrent Neural Networks (RNN), Recursive Neural networks) and/or natural language processing components (e.g., the meeting content clarifier 261). For example, identifying the correcting beginning may include identifying, within character sequences, verbs or other parts of speech or words (e.g., names of people) indicative of initiating a command or imperative sentence (e.g., Work, please, John doe). These are indicative of the start of an action items, such as "John, please complete task X by Friday," where John is the beginning. In some embodiments, identifying the correct end may include identifying natural language break identifiers, such as periods, question marks, semicolons and the like. These are indicative of the end of action items. For example, using the illustration above, "John, please complete task X by Friday" may include a period directly after the word Friday, which is indicative of the end of the action item based on the period.

In some embodiments, a first model is used to identify the correct beginning of the presented text and a second model is used to identify the correct end of the presented text. These or other model techniques can take several tests together to have one network understand the meaning of a sentence or other character sequence (e.g., phrase, paragraph) based on the tests. Accordingly, these combination of models can predict, for example, if the next sentence is the answer to the first sentence. In these embodiments, relationships are learned between sentences or other character sequences and the labels or classifications can be whether a character sequence candidate "is the next sentence" or "is not the next sentence." In this way, it can be predicted whether a first sentence, for example, is the sentence that proceeds or follows a second sentence or whether the sentence is a random sentence. This can be useful in situations, for example, where a meeting participant starts engaging in an action item, is interrupted or otherwise engages in discussion of other topics, and then there is a continuation of the action item. In this way, embodiments can predict that the first two character sequences do not fit with each other. For example, a portion of a transcript may read, "Bob, we have a meeting Friday so [first character sequence] . . . wait Jack, before you keep going let me just say . . . [second character sequence] as I was saying Bob, let's get project X done [third character sequence]." Accordingly, embodiments can predict that the first character sequence and the third character sequences go together, which may help indicate that "get project X done" may be the end of the action item and "Bob" is the beginning of the action item.

In an example illustration of a model that may be used to define beginnings and/or ends of action items, BERT models or other similar models can be used. BERT generates a language model by using an encoder to read content all at once or in parallel (i.e., it is bidirectional), as opposed to reading text from left to right, for example. This allows the model to learn the context of a word or other character sequences based on its event context. The input is a sequence of tokens (e.g., natural language sentence or other character sequence) that are first embedded into vectors (e.g., via GloVe or other word embedding) and then processed through a neural network. The output is a sequence of vectors where each vector corresponds to an input token with the same index. These models overcome typical language models that predict the next word or other character sequence, using a directional approach. However, a directional approach inherently limits context learning because it only uses the context either before or after a word or character sequence.

In some embodiments, defining the end of action items includes an algorithm of two or more steps. First existing punctuation or ending character sequence ending identifiers (e.g., periods, question marks, semi-colons, and the like) may be identified to determine character sequence length of the text to the left of or preceding the sequence ending identifier. For the second step, a component may extract or copy the next or succeeding five (or other predetermined number) words after the beginning word or other character sequences and feed them through a DNN to determine if the third (or other predetermined number) word or other character sequences is the action item's end location. In various embodiments, the second step is done based at least in part on parts of speech of the predetermined word, their corresponding updated display text length, and/or the specific word itself, which may be a word that is typically associated with a command or action item (e.g., a request to complete an action item by "tomorrow," where tomorrow is the end of the action item). In various instances, the longer action item candidate are, the more likely a word will be chosen as an ending point earlier in a character sequence in order to make the presented action items shorter. Conversely, the longer action item candidate are, the more likely a word will be chosen as an ending point later in a character sequence in order to make the presented action item longer. For example, for the phrase "Don, please visit Jake today," it can be determined whether "visit," "Jake," or "today" is the best word to end the action item based on all of the end candidates' part of speech, words, and length. Given the short length of the character sequence, "today" being a key word indicative of the end of an action item, and "today's" part of speech, the word "today" may be chosen as the ending boundary of an action item, such that the presented action item is "Don, please visit Jake today."

The action item boundary generator 283 also perform deduplication in some embodiments. Deduplication of action items may include removing redundant or repetitively stated action items. For example, the action item, "Get Y done by Friday" may be stated twice in a meeting and so one of the statements may be removed. Verifying consistency and consolidation may include combining differently stated versions of the same office action. For example, a first action item may be "Rex, let's perform project Y." A second action item may state "so yes . . . let's keeping plugging away to get project Y done." These two action items may be consolidated into one action items that are transformed in a manner that is consistent with both statements, such as "Rex will perform project Y." In some embodiments, the action items clarifier uses the dedup logic 237. In some embodiments, word embedding models (e.g., Word2Vec or other structures may be used to indicate whether statements are semantically similar (e.g., within a cosign distance). Accordingly, when statements are semantically similar, they can be combined by linearly combining or generating a single sentence (e.g., via NLP) to represent all of the statements.

The action item clarifier 285 is generally responsible for generating a clarity score and clarifies action item candidates, such as in terms of what the action item is referring to, who owns the action item (i.e., who is responsible for completing the action item), who stated the action item, and/or when is the action item due. In some embodiments, the action item clarifier 285 receives, as input, the action item candidates with appropriate boundaries or beginning and end words, as described above with respect to the action item boundary generator 283. In some embodiments, this may obtained based on contextual data obtained by the meeting monitor 250, information in the user profile 240, and/or classification made by the action item candidate classifier 264. Some statements made during meetings or other events are incomplete or otherwise unclear as to the rest of the context. Accordingly, the action item enrichment 282 can use contextual data as signals to clarify action items. For instance, a statement in a meeting may state, "okay go do X starting tomorrow." From this statement alone it may be unclear who is talking and who is supposed to be performing X starting tomorrow. However, external contextual data obtained from a chat prior to the meeting by the meeting monitor 250 may indicate that Jane Doe was supposed to perform X and that Alexis, her boss, would tell her during the meeting when to complete X. Accordingly, Alexis may be the owner of the action item and thus the action item can be attributed to her.

In some embodiments, the action item clarifier 285 generates a clarity score indicative of how clear an action item is (e.g., based on whether the action item candidate indicates who owns the action item, the due date of the action item, who stated the action item, and the like). In some embodiments, this score is part of a regression model where continuous scores or score ranges are provided where, for example, the higher the score, the more likely a candidate is clear and the lower the score, the more likely a candidate is not clear. Alternatively, in some embodiments, the score is part of a classification model, where the labels are categories and confidence level scores can be associated with the labels. In these embodiments, the labels can be, for example, "clear" or "not clear."

In some embodiments, there are three separate models, each of which is used to determine who owns/stated the action item, what the action item is, and when the action item is due. In some embodiments, these three models are part of ensemble learning in an ensemble model. Ensemble learning helps improve machine learning results by combining multiple models. That is, various meta-algorithms combine multiple machine learning techniques into one predictive model in order to decrease variance or bagging, bias or boosting, and/or improve predictions or stacking. In this way, for example, each of the three "who," "what," and "when" scores can be combined to make a prediction. Using these three scores, it can be determined whether character sequences have explicit objects, such as a noun, a name (indicative of the "who"), a time indicator (e.g., "tomorrow," or other date indicative of the "when"), and the like. With ensemble learning, there can be better prediction performance using a relatively small training data set compared to existing technologies.

In an illustrative example of the models used to determine the "who," "what," and "where," DNNs, Naïve Bayes, HMMs, and/or random forest models can be used. For example, using random forest for the "who" clarity score, the classified labels corresponding to the leaf nodes may be the names of each meeting attendee as indicated in the contextual data. A least a portion of the root and branch node tests within each decision tree may be different but arrive at the same leaf node. For example, two leaf nodes may be Bob and Jack indicative of the meeting participants. One branch node of a first decision tree may be whether the action candidate has a certain utterance or phrase, such as "let's light the fire . . . ," which may be indicative that Bob said this based on similar utterances by Bob as indicated in historical external contextual data of past meetings. Accordingly, the traversal down the tree may be down the path that leads to Bob, and not Jack. Additionally, a different decision tree may have a branch node test of a particular voice recognition fingerprint and if a real-time or voice recorded fingerprint matches Bob, the Bob leaf node is likely to be selected. Then a voting can occur to see which leaf nodes are selected the most in each decision tree, which, using this example Bob has been unanimously selected. In some embodiments, a similar process can be performed for the owner of the action item, when the action item is due, and what the action item is.

In some embodiments, the action item clarifier 285 can map content character sequences to the identity of the speaker or person responsible for completing the action item in any suitable manner. For example, in some embodiments, a voice-recognition component can be used on audio content input to map phonemes of the input to a library of known or predetermined phonemes of particular users (e.g., as found within the user behavior history of contextual data). Accordingly, a voice-recognition component can record each user's voice in the user profile 240 (e.g., each user that can potentially attend a meeting). In this way, a prediction can be made that a particular parsed character sequence was said by a particular user. Alternatively or additionally, the mapping or association can include a written transcript with a person's name or other identifier next to each character sequence. In an illustrative example, the action item clarifier 285 can take as input, a written transcription of a meeting. The sentence, "we need to finish the draft by Friday" may be tokenized to individual words where the subject of the sentence is tagged (e.g., we), the verb of the sentence is tagged (e.g., finish), and the object of the sentence is identified (e.g., draft), as well as semantic context, such as "action item draft to be finished by Friday," as well as indicating that John, the manager, said this.

The action item context generator 286 is generally responsible for determining and/or causes presentation of a particular amount of event context (and/or external context) associated with the action item. Event context may be shown to users for convenience and may be useful when users are still unclear about information associated with displayed action items. For example, even after the action item enrichment 282 has generated all the information necessary and an action item is subsequently displayed, the user may still not understand, for example, what the action item is referring to or who owns the action item. Accordingly, the user can scroll down, open a window, or otherwise view other portions of an event transcript to see the event context to determine this unclear information. In some embodiments, the determining of the particular amount of event context to display is determined based at least in part on the clarity scores and/or other functionality (e.g., the beginning and end boundaries of an action item candidate) with respect to the action item enrichment 282. For example, the amount of event context displayed may have an inverse relationship with the clarity score. That is, the higher the clarity score indicative of an action item candidate being clear, the less context is provided for display. Conversely, the lower the clarity score indicative of an action item candidate not being clear, the more context is provided. In some embodiments, if the clarity score is over a threshold score, a particular quantity of event context is shown. Conversely, if the clarity score is below a threshold score, another particular quantity of event context is shown.

The enriched action item assembler 288 is generally responsible for generating a list of action items and may also provide related information, such as event context. For example, the enriched action item assembler 288 can generate a list of action items and consolidate it with other information determined by the action item enrichment 282, such as who owns the action item, who stated the action item, when the action item is due, and what the action item is. In some embodiments, the enriched action item assembler 288 additionally or alternatively assembles other contextual data, such as files, project names, and/or other associated information. For example, a meeting may have included a POWERPOINT presentation, which may be included with the list of action items or other information in preparation for display.

In some embodiments, the enriched action item generator 280 uses enrichment logic 239. Enrichment logic 239 may include rules, associations, conditions, predictions and/or models, or pattern inference algorithms that are utilized for determining enriched content related to an action item. Enrichment logic 239 can take many different forms depending on the particular task associated with the action item, event context, and/or external, contextual information, for example. Some embodiments of enrichment logic 239 may comprise one or more models, machine-learning mechanisms, and/or other statistical measures to determine boundaries of action item candidates, clarify action items, and/or generate action item context, such as described above in connection with enriched action item generator 280 or its subcomponents (e.g., the machine learning models described with respect to the action item boundary generator 283 and/or the action item clarifier 285). In some embodiments, the enrichment logic 239 can be included in the clarity model(s)/layer(s) 308 of FIG. 3, the beginning/end model/layer 303 of FIG. 3 or otherwise used by the system 300 as further described in connection with FIG. 3

Continuing with system 200 in FIG. 2, feedback handler 270 is generally responsible for capturing or receiving user feedback and retraining models to update the models or otherwise recording the feedback in memory. For example, according to an embodiment, a user interface is provided wherein a user can select a button (or otherwise provide input) indicative of the action item not being understandable (e.g., in terms of who stated office action or who owns the office action) or not being an action item at all. The feedback handler 270 may record the feedback input and utilize it to reconfigure particular logic or retrain or otherwise tune particular one or more models utilized for generating the enriched action items. For example and without limitation, in some embodiments, the model(s) that may be tuned or retrained via the feedback handler 270 can include action item identification logic 230 or enrichment logic 239, described in connection with FIG. 2, or the action item prediction model/layer 302 and/or the clarity model(s)/layer(s) 308 described further below with respect to FIG. 3. In an illustrative example, if a user indicated that a displayed action item is not an action item, then the action item prediction model/layer 302 can use this information to determine a lower a score (or other confidence level) so that at a future time, if the same or similar action item candidate is submitted to be an action item, it will be marked lower in confidence as actually being an action item. In some embodiments, feedback handler 270 handles feedback as described in connection with FIGS. 8A and 8B.

Example system 200 also includes a presentation component 220 that is generally responsible for presenting content and related information to a user, such as the content related to user feedback. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, and/or other user data, presentation component 220 may determine on which user device(s) content is presented, as well as the context of the presentation, such as how (or in what format and how much content, which can be dependent on the user device or context) it is presented, when it is presented. In particular, in some embodiments, presentation component 220 applies content logic to device features, or sensed user data to determine aspects of content presentation.

In some embodiments, presentation component 220 generates user interface features associated with information generated by the action item enrichment 282, the action item context generator 286 and/or the enriched action item assembler 288. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 220 can present action items that include the highlighted boundaries of the action item as determined by the action item enrichment 282. The presentation component 220 can additionally or alternatively present other missing information, such as who owns the action item, who stated an action item, the due date of the action item, and what the action item is referring to as determined by the action item enrichment 282. The presentation component 220 can additionally or alternatively present the particular quantity of context needed as determined by the action item context generator 286. The presentation component 220 can take, as input, the information assembled by the enriched action item assembler 288 and cause presentation of this information on a user interface.

In some embodiments, a personal assistant service or application operating in conjunction with presentation component 220 determines when and how (e.g., presenting only action items or action items with metadata, as opposed to entire meeting transcript) to present the content. In such embodiments, the content, including content logic, may be understood as a recommendation to the presentation component 220 (and/or personal assistant service or application) for when and how to present the notification, which may be overridden by the personal assistant app or presentation component 220.

Continuing with FIG. 2, as described previously, example system 200 may include or operate in conjunction with one or more consumer applications 290. Consumer applications 290 generally refers to one or more computer applications or services, such as online/cloud applications or locally stored apps that consume or utilize the enriched action item information determined by system 200. In particular, a consumer application 290 may receive enriched action item information for a particular user, and present, manage, or schedule aspects of the action item to the user. In some embodiments, a consumer application 290 may utilize a presentation component 220 to provide an enriched action item to a user responsible for completing and/or stating action items (and/or other users who were participants of a meeting). Examples of consumer applications 290 may include, without limitation, computer applications or services for facilitating meetings or communications (e.g., MICROSOFT TEAMS®, MICROSOFT DYNAMICS®); email, messaging, chat, or calling; project management; calendar or scheduling; and task list or to-do applications (e.g., MICROSOFT WUNDERLIST®, MICROSOFT TO-DO®)). In some embodiments, enriched action items (or a portion of their contents) are be made accessible to a consumer application 290.

Figure 3:
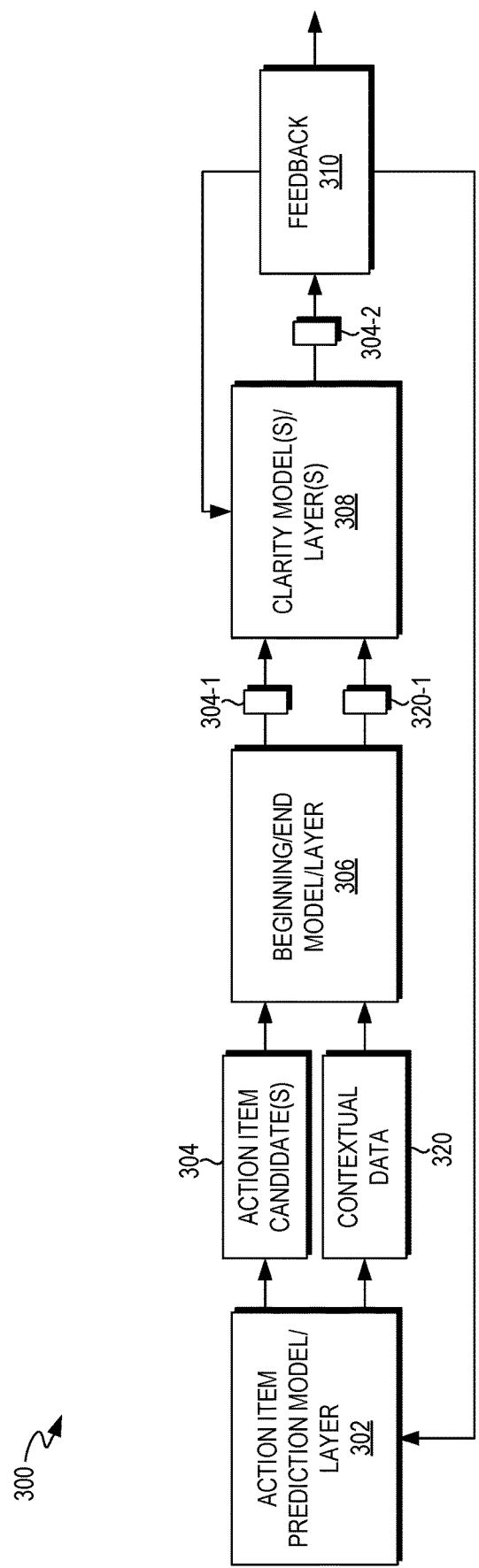
FIG. 3 is a block diagram of an example system illustrating models, or layers of a single model, that can be utilized to generate action items and related enriched content, and illustrating aspects of how the models or layers can be tuned based on receiving user feedback, in accordance with an embodiment.

Turning to FIG. 3, a block diagram of an example system 300 is provided illustrating the models (or layers of a single model) that can be used to generate enriched action items and associated data, as well as how the models or layers can be tuned based on receiving feedback, according to some embodiments. In some embodiments, the enriched action item generator 280 of FIG. 2 utilizes the beginning/end model/layer 306 and/or the clarity model(s)/layer(s) 308 illustrated in FIG. 3 to make predictions or inferences of an action item and/or enriched content associated with an action item. Likewise, in some embodiments, the action item determiner 260 of FIG. 2 uses the action item prediction model/layer 302 to make predictions or inferences. The action item prediction model/layer 302 is used (e.g., by the action item candidate classifier 264) to classify or otherwise predict whether a set of characters are action items. The input to the action item prediction model/layer 302 is a set of character sequences, such as a transcript of an entire meeting where both action items and non-action items exist, which may include event context. In some embodiments, external context may also be provided. In some embodiments, the action item prediction model/layer 302 is a CNN model or other suitable machine learning model. The output is a set or list of action item candidates 304, as well as contextual data, which are both inputs used for the beginning/end model/layer 306.

The beginning/end model/layer 306 is used (e.g., by the action item enrichment 282) to determine optimal beginning and/or end of action item candidates, such as described above with respect to the action item boundary generator 283 generating the boundaries of action item candidates. For example, the beginning/end model/layer 306 can take all of the event context and either supplement the action item candidates with more of the event context (e.g., add words) such that the supplemented information is now the action item candidate. Alternatively or additionally, this model may be used to remove character sequences from the action item candidate such that the new action item candidate reflects the removed text. In an illustrative example, The action item candidate "He will send" as well as the rest of the event context can be used by the beginning/end model/layer 306 to add event context, such that the new action item candidate is "He will send the file tomorrow," where "the file tomorrow" was the event context originally directly after the action item candidate "He will send." In this way, "He" and "tomorrow" mark the boundaries for the new action item candidate, where "He" is the beginning word of the action item candidate and "tomorrow" is the end word of the action item candidate. The output of the beginning/end model/layer 306 is the new action item candidate (e.g., "He will send the file tomorrow) and the updated contextual data 320-1, since some of the contextual data 320 may now have become action item candidates in some embodiments. In some embodiments, however, the contextual data 320-1 is the same contextual data as contextual data 320. In some embodiments, the beginning/end model/layer is an additional machine learning model or set of models, such as a deep learning machine learning model to determine the boundaries of the action item candidates.

A component (e.g., the action item enrichment 282) then uses this outputted information from the beginning/end model/layer 306 and the clarity model(s) 308 to modify or supplement the new action item candidates with data that at least partially completes or at least partially clarifies any missing or incomplete information within or associated with one or more action item candidates. For example, using the illustration above "He will send the file tomorrow," a clarity score may be generated indicating that it is unclear who made this statement as well as who owns the statement. When the contextual data and the action item candidate(s) are run through the clarity model(s)/layer(s) 308, the output 304-2 can include the names of the person(s) who made this statement and own this statement, as well as the action item candidates. For example, the new output 304-2 may include replacement words within the action item candidate 304-1, such as "[John]: "[Jake] will send the file tomorrow," indicating that John made the statement, and Jake is the person responsible for sending the file tomorrow. Alternatively, replaced words embedded in the action item candidate 304-1 need not be provided at the final output 304-2, but rather the action item 304-1 can be outputted with supplemental information. For example, using the illustration above, the output "He will send the file tomorrow" can be supplemented with information such as, "John made this statement that Jake is responsible for," representing the output 304-2. In some embodiments, the clarity model(s)/layer(s) can be one or more machine learning models, such as an ensemble model, or any other suitable model described with respect to the action item enrichment 282. In some embodiments, the output 304-2 is what is presented or displayed to a computing device, such as within a user interface.

The feedback 310 represents any user feedback indicative of whether presented action items are indeed action items or whether there is still missing or unclear information. Input made by users indicating that action items are actually not (or are) action items is fed into the action item prediction model/layer 302. And input made by users indicating that there is still unclear or missing (or the action item is correct) information (e.g., speaker of action item, owner of action item, due date of action item) is fed into the clarity model(s)/layer(s) 308. These inputs can be used for additional tuning or training of the models/layers in order to learn from this user feedback. For example, in response to receiving a selection of a thumbs-down icon on a user interface (representing that the presented action item is not an action), the action item prediction model/layer 302 can be tuned such that the same or similar submitted action item candidate is scored lower (e.g., there is a lower confidence level) towards actually being an action item.

Figure 4:
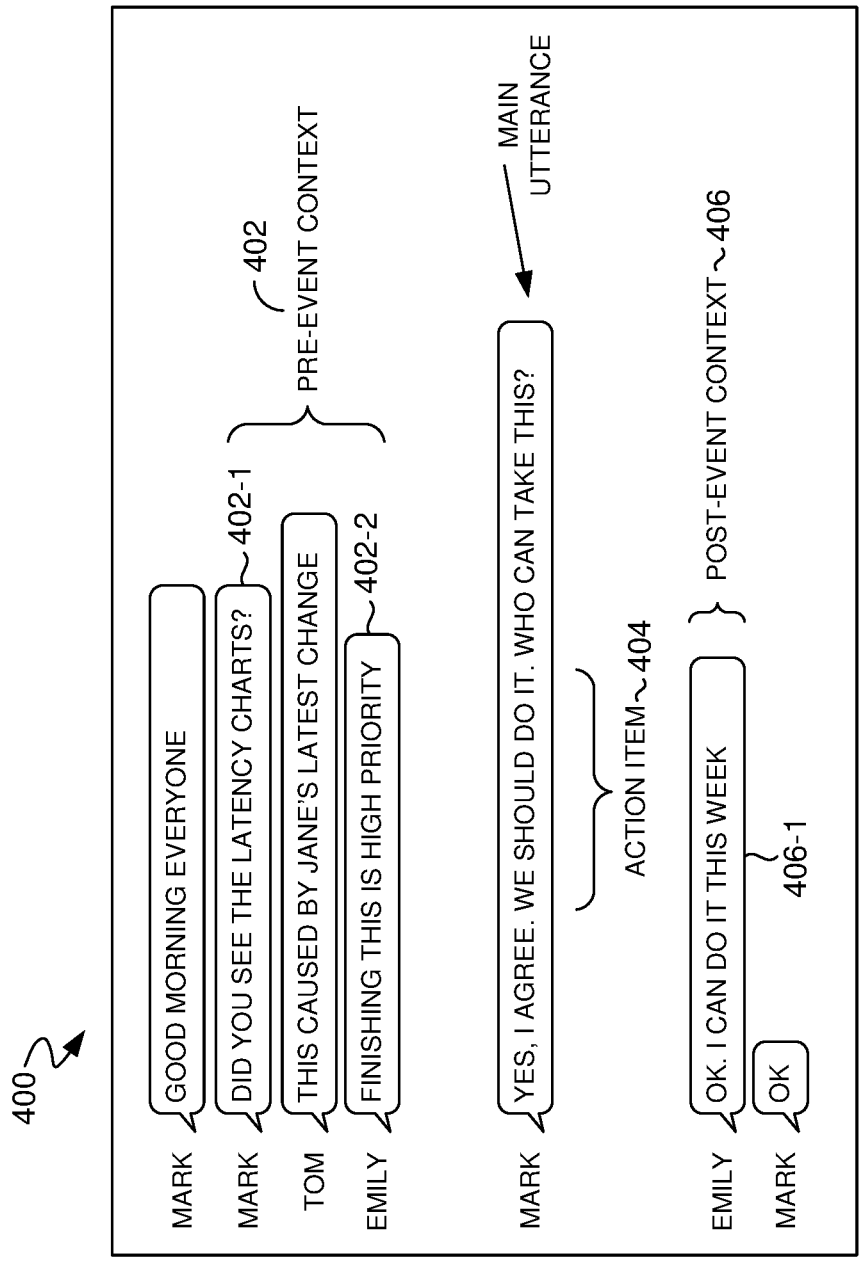
FIG. 4 is a schematic diagram of a presented action item embedded into event context, in accordance with an embodiment.

FIG. 4 is a schematic diagram of a presented action item 404 embedded into event context 400, according to some embodiments. In some embodiments, the event context 400 is represented within a user interface or displayed text, such as in a chatroom or other online event venue. As illustrated in FIG. 4, the action item 404 "we should do it" can appear very unclear, such as "who" is to do it, and what "it" is referring to. Various embodiments of the present disclosure can use other event context, such as the pre-event context 402 (e.g., the character sequences that were inputted before the action item candidate 404 was inputted), and the post-event context 406 (e.g., the character sequence that were inputted after the action item candidate 404 was inputted). Alternatively or additionally, various embodiments can use external contextual data, such as texts, emails, calendar data, and the like. For example, using the illustration of FIG. 4, embodiments (e.g., the action item enrichment 282, via the BERT model) can predict that "it" refers to finishing latency charts based on the statements 402-2 and 402-1 made by Mark and Emily, as well as outside emails that describe the latency charts being the topic of the meeting. Additionally, embodiments can predict that the due date is "this week" based on the statement 406-1 made by Emily.

FIG. 5A illustrates an example screenshot 500 indicating content of a meeting event, according to some embodiments. FIG. 5A represents a virtual or online meeting or chat between meeting participants or attendees. The screenshot 500 may represent all of the event context of an event, such as everything that was uttered or stated during the event. This may include statements or threads, such as 503 and 501 that do not indicate action items as well as statements or threads, such as 505, that include action items. In some embodiments, everything within the screenshot 500 (and/or 500-1, 500-2) or similar screenshots, is provided for display and is included in the output 304-2 of FIG. 2 or represents the output of the action item enrichment 282 of FIG. 2. In some embodiments, the screenshot 500 (and/or 500-1, 500-2) is generated by the presentation component 220 of FIG. 2.

Figure 5B:
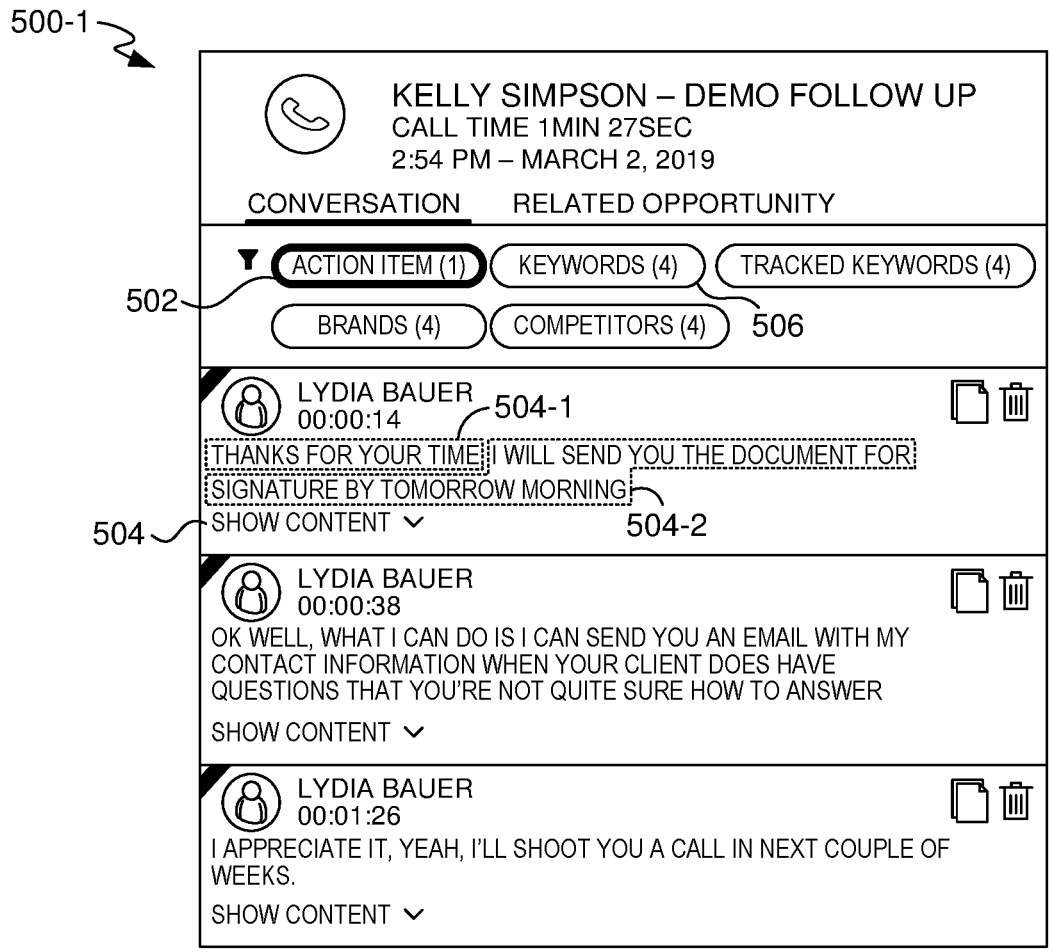
FIG. 5B illustrates an example screenshot indicating a list of action items or action item candidates, based on the meeting content from FIG. 5A, in accordance with an embodiment.

FIG. 5B illustrates an example screenshot 500-1 indicating a list of action items/action item candidates, according to some embodiments. In some embodiments, in response to receiving a selection of the button 502 (e.g., within the screenshot 500 of FIG. 5A), each action item is listed, as well as event context. For example, for the statement or character sequence 504, both the pre-event context 504-1 as well as the action item candidate 504-2 are displayed. As illustrated within the statement 504, the action item candidate 504-2 is highlighted, which shows where the boundaries of the action item or where the action item begins and ends. That is the word "I" starts the action item 504-2 and the word "morning" ends the action item 504-2. In some embodiments, the action item enrichment 282 finds the optimal boundaries, as illustrated above, and causes presentation of the boundaries, as indicated in the action item 504-2. For example, the action item enrichment 282 may use the beginning/end model/layer 306 to define and present the highlighted boundaries. Highlighting may include superimposing data or otherwise changing fonts or formats of character sequences, such as bolding character sequences as illustrated within the action item 504-2. In some embodiments, the (1) symbol within the button 502 indicates that there is only 1 action item determined within a particular event (or particular UI view of the particular event), although it is understood that there may be any quantity of action items within a particular view.

Figure 5C:
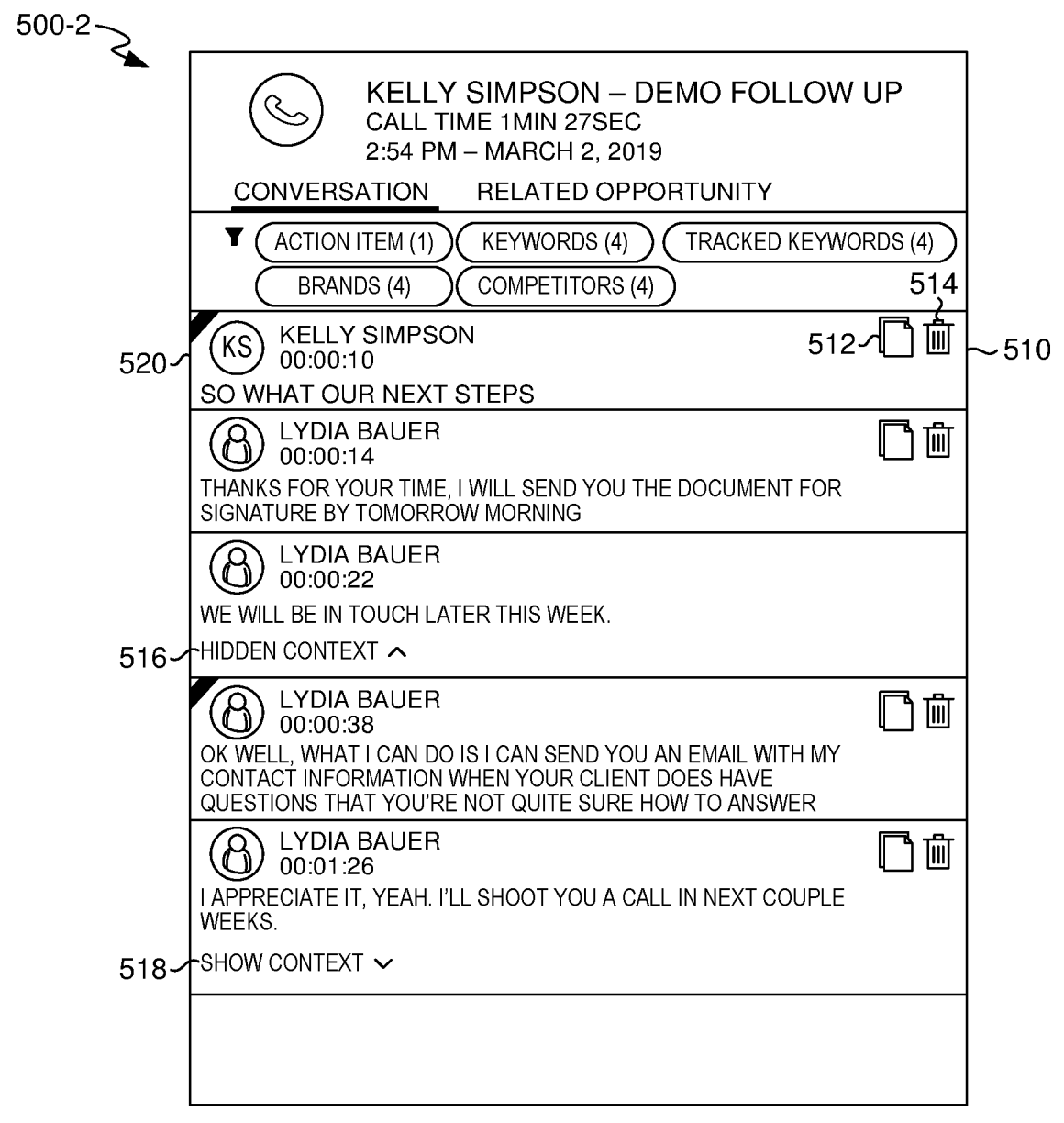

FIG. 5C illustrates an example screenshot 500-2 indicating various other user interface features, according to some embodiments. In some instances, statements or other character sequences do not include any action items, such as the statement 520. Accordingly, embodiments can receive an indication of a selection of the user interface element 514 (a trash can), which is indicative of user input indicating that the associated statement or character sequence is not an action item. For example, as soon as a user sees the character sequence 520, the user can hover a graphical pointer over the element 514, at which point the prompt "This is not an action item" is displayed. The user can then select the element 514, at which point embodiments (e.g., the feedback handler 270) receive the selection and remove the character sequence 520 and/or otherwise flag the character sequence 520 as not being an action item. Alternatively, the embodiments can also receive an indication of a selection of the user interface element 512. In response to receiving an indication of a selection of the element 512, which corresponds to user input indicating that the associated statement or character sequence is an action item, embodiments (e.g., the feedback handler 270) can flag the associated character sequence as being an action item. As described in more detail below, the selections of the user interface elements 514 and 512 or similar elements can be used for training machine learning systems.

In response to receiving an indication of a selection of the "Hide context" feature 516, embodiments (e.g., the action item context generator 286) can remove additional event context for display. Likewise, in response to receiving an indication of a selection of the "show context" feature 518, embodiments (e.g., the action item context generator 286) can add event context for display. This may arise in situations where, for example, the user is still unclear about information associated with an action item, such as the due date of the action item or the like. Alternatively, the user may only want to view action item candidates or only character sequences that include action item candidates (e.g., statement 504 of FIG. 5B), and so the user may desire to collapse or remove other event context. As described above, in some embodiments, the amount of event context is initially presented or displayed based at least in part on the clarity or clarity score of action item candidates. Subsequent to this, the user may still select the features 516 and/or 518 to manually adjust presented event context.

Figure 6:
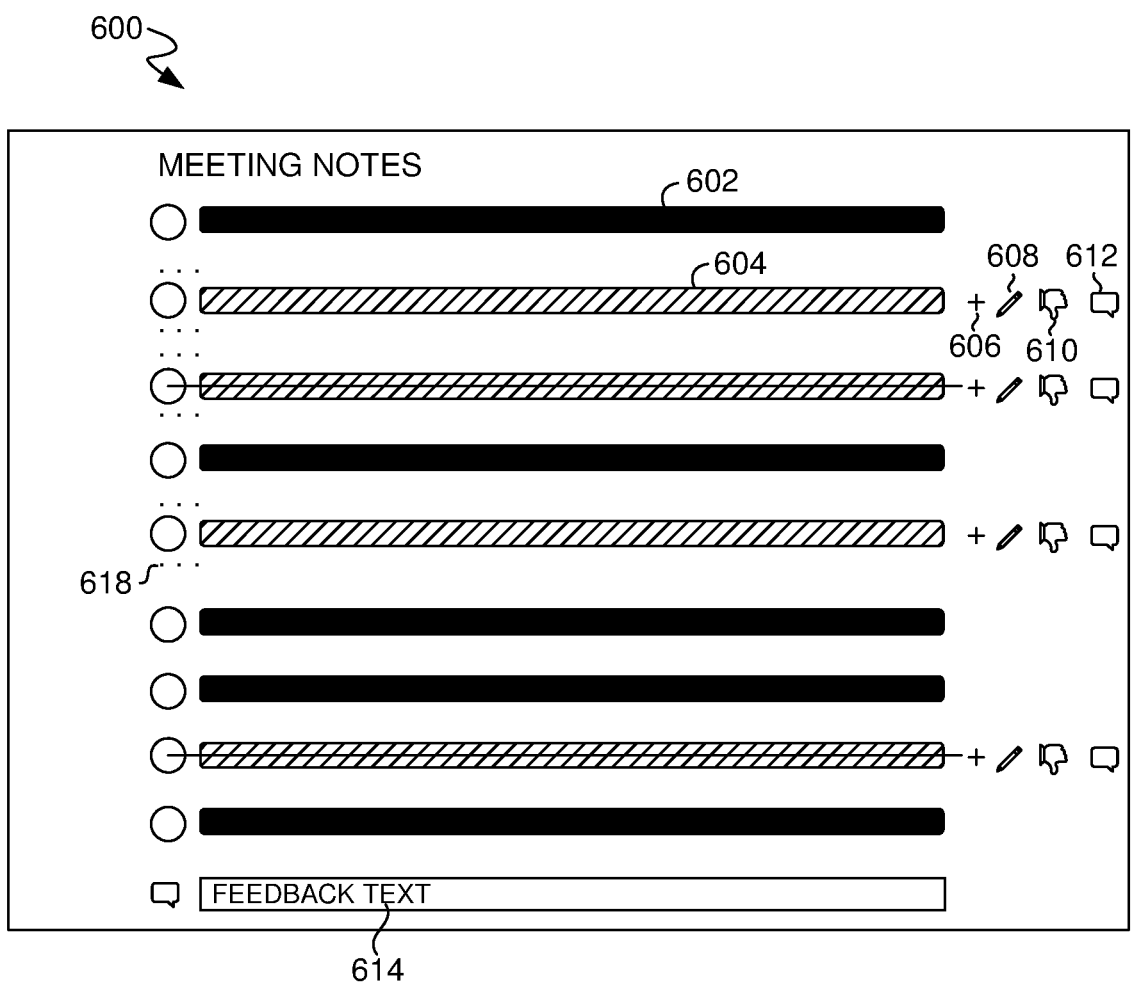
FIG. 6 is an example screenshot of a user interface, in accordance with an embodiment.

FIG. 6 is an example screenshot 600 of a user interface, according to some embodiments. In some embodiments, the screenshot 600 includes some or all of the output 304-2 of FIG. 3. In some embodiments, the screenshot 600 includes the final output of the system 200, as provided by the presentation component 220 of FIG. 2. In some embodiments, the screenshot contains information as determined or provided by the action item enrichment 282 of FIG. 2. FIG. 6 illustrates various meeting event notes and particular user interface elements. The user interface element 602 represents a field or data object that is configured to receive action items that the user has added manually. The text of element is not shown for simplicity. The user interface element 604 represents action items that embodiments (e.g., the system 200) has generated or otherwise implicitly extracted from the event context. User interface element 606 is a selectable feature that is configured to receive user selections that are indicative of confirmation that the action item is accurate and/or clear. Alternatively, in some embodiments the, user interface element 606 is used to expend or show more context. In some embodiments, less context may be shown as illustrated, for example, by the strikethrough markings that indicate less context shown.

The user interface element 608 is a selectable feature that is configured to receive user selections that are indicative of the user requesting to edit text within the action item or other event context associated with the action item. Accordingly, in some embodiments, in response to receiving an indication that the element 608 has been selected, particular embodiments may cause the text within the action item candidate 604 to become editable. For example, subsequent to the selecting of the element 608, the user may input the owner of the action item, the due-date, the speaker, and the like.

The user interface element 610 is a selectable feature that is configured to receive user selections that are indicative of user feedback that that action item is not actually an action item or other information (e.g., speaker, owner, and the like) is not clear. The user interface element 612 is a selectable feature that is configured to receive user selections indicative of user feedback regarding a specific action item (e.g., the action item 604). For example, in response to receiving a selection of the feature 612, some embodiments (e.g., the presentation component 220) may cause presentation of a window, field, or other element so that the user can manually enter in notes regarding a corresponding action item, such as the owner, speaker, due date, and the like. The user interface element 614 is a field or other object that is configured to receive manual user input indicative of general feedback regarding the entire meeting event or all of the list of action items. For example, the user interface element 614 may receive natural language input from users, such as, "overall, action items were accurate," or "Note: next meeting is Wednesday the $25^{th}$." In some embodiments, selection of the elements 606, 608, 610, 612, and/or 614 can be used by embodiments (e.g., the feedback handler 270 as feedback 310) to train or tune one or more machine learning model, which is described in further detail below.

Figure 7:
FIG. 7 is an example screenshot of a user interface, in accordance with an embodiment.

FIG. 7 is an example screenshot 700 of a user interface, according to some embodiments. In some embodiments, the screenshot 700 includes some or all of the output 304-2 of FIG. 3. In some embodiments, the screenshot 700 includes the final output of the system 200, as provided by the presentation component 220 of FIG. 2. In some embodiments, the screenshot 700 contains information as determined or provided by the action item enrichment 282 of FIG. 2. FIG. 7 illustrates various event action items, contextual data, and particular user interface elements.

The user interface element 702 is selectable and is configured to cause display of more content or event content in response to its selection. For example, in response to receiving an indication of a selection of the user interface element 702, embodiments may cause display of more event context may be displayed in addition to the action item 706, similar to the event context 708 (e.g., statements that were made before and/or after the action item 706 was stated). User interface element 704 is selectable and is configured to cause display of less content in response to its selection. For example, in response to receiving an indication of a selection of the user interface element 704, embodiments may cause a removal of the context data 708 within the screenshot 700 such that the only displayed item associated with this event context is the action item 710.

The presented indicia of the action item 710 indicates that its boundaries are highlighted (e.g., underlined and bolded as generated by the action item enrichment 282 as described above). In this way, users can quickly identify which text corresponds to action items and which text does not, since the non-action item data is not highlighted. In some embodiments, the default quantity or amount of event context to present with each action item candidate (e.g., 710, 706) is determined by the corresponding action item's clarity score, as described above with respect to the action item context generator 286 of FIG. 2. For example, a high clarity score indicative of the action item 706 not missing any information or is otherwise clear may be generated. Responsively, only the action item 706 may be displayed as illustrated in FIG. 7. In another example, a low clarity score indicative of the action item 710 missing information or not being clear may be generated. Responsively, the event context 708 may additionally be caused to be displayed along with the action item 710 as illustrated in FIG. 7.

The user interface element 712 is selectable and configured to cause expansion of event context or other content in response to its selection. For example, in response to receiving an indication of a user selection of the element 712, embodiments (e.g., the presentation component 220) may cause more event context and/or action items to be displayed, such as the entire transcript of an event. For example, the screenshot 700 may represent a list of action items identified in a meeting with its selectively generated event context, as described above. In response to a selection of the user interface element 712, embodiments may cause display of the entire transcript of the meeting event or additional event context relative to the event context as shown as a result of receiving an indication of a selection of the elements 702 and/or 704.

The user interface elements 714, 716, and 718 represent different user feedback features for the particular action item 706. Identical user interface elements are also displayed under other corresponding action items, such as action item 710. In some embodiments, the user interface elements 714, 716, and 718 perform the same or similar functionality to user interface features 606, 610, and 612 of FIG. 6 respectively. In some embodiments, the user interface elements 714 additionally or alternatively include the same or similar functionality of user interface elements 514 and 512 of FIG. 5 respectively. Accordingly, embodiments (e.g., the feedback handler 270) can receive an indication of one or more selections indicative that an action item is/is not clear or is otherwise missing information and/or is/is not an actual action item. In this way, the user feedback (e.g., the feedback 310) can be used by one or more machine learning models to make future predictions of action items and/or the amount of event context to display based on this information, as described above.

Figure 8A:
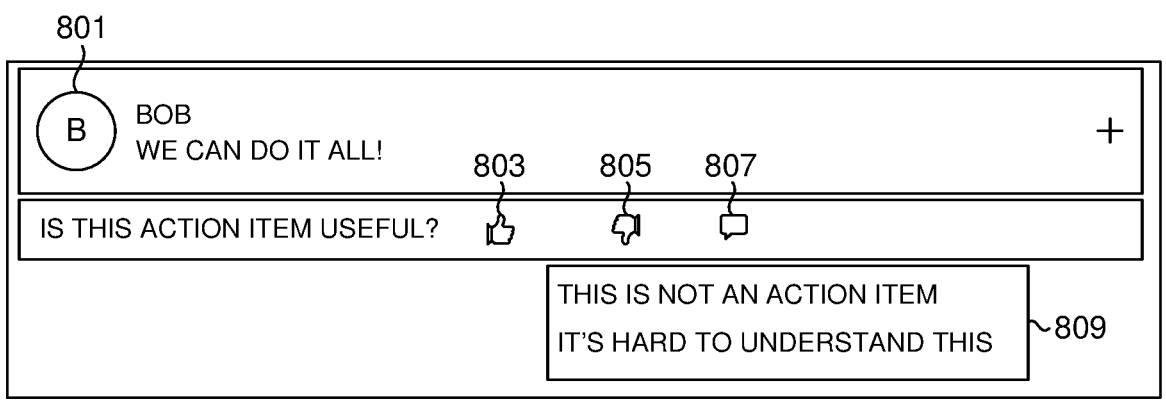
FIG. 8A illustrates an example action item candidate and associated user interface elements, in accordance with an embodiment.

FIG. 8A illustrates an example action item candidate, and associated user interface elements, according to some embodiments. In some embodiments, the user interface elements 803, 805, and 807 represent or perform the same functionality as user interface elements 714, 716, and 718 of FIG. 7 respectively, and/or user interface features 606, 610, and 612 of FIG. 6 respectively. In some embodiments, the user interface elements 803 additionally or alternatively include the same or similar functionality of user interface elements 514 and 512 of FIG. 5 respectively. Accordingly, embodiments (e.g., the feedback handler 270) can receive an indication of one or more selections indicative that the action item 801 is/is not clear or is otherwise missing information and/or is/is not an actual action item. In this way, the user feedback (e.g., the feedback 310) can be used by one or more machine learning models to make future predictions of action items and/or the amount of event context to display based on this information, as described above. Such user feedback is illustrated in FIG. 8B, which is a schematic diagram illustrating how the user selections of FIG. 8A can be used to train or tune a respective machine learning model.

In response to receiving indication of a user selection of the user interface element 805, embodiments (e.g., presentation component 220) can cause display of the window 809. Subsequently, embodiments can receive a user selection of the indicia within the window 809 that reads "this is not an action item" or "it's hard to understand this." In response to receiving an indication that the "this is not an action item" text was selected (representing the "negative feedback" 812 as illustrated in FIG. 8B), the selection is then run through the neural network 806 (which can be any machine learning model) such that embodiments can be tuned or otherwise learn this for future predictions 804. For example, in response to this selection, embodiments (e.g., the presentation component 220) may cause the action item 801 to be removed from display or otherwise not be highlighted indicating that it is an action item. Such removal can occur during a same session that initially indicated the action item 801 or for future sessions. Alternatively or additionally, any future similar action item candidates can be scored toward a lower probability of being an action item based on the selection of element 805.

Figure 8B:
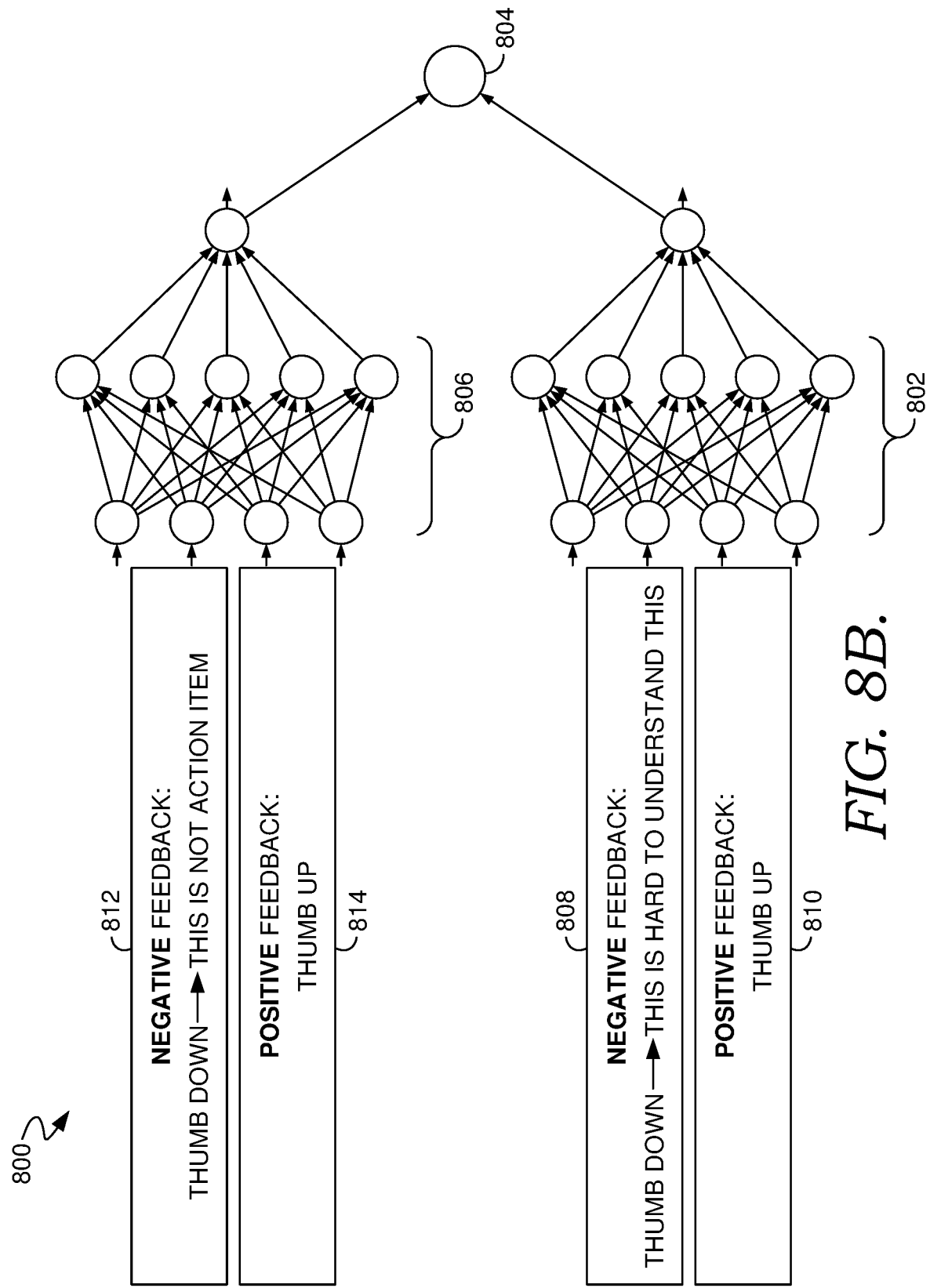
FIG. 8B is a schematic diagram illustrating how user selections of FIG. 8A can be utilized to train or tune a respective machine learning model, in accordance with an embodiment.

In similar fashion, in response to receiving indication of a user selection of the user interface element 803 (representing the "positive feedback" 814 as illustrated in FIG. 8B), embodiments (e.g., presentation component 220) can run the selection through the neural network 806 such that embodiments can be tuned or otherwise learn this for future predictions 804. The positive feedback 810 is indicative of the user indicating that particular context is indeed an action item. For example, in response to this selection, embodiments (e.g., the presentation component 220) may cause the action item 801 to be kept for display or otherwise be highlighted indicating that it is an action item (both for a current session and future sessions). Alternatively or additionally, any future similar action item candidates can be scored toward a higher probability of being an action item based on the selection of the element 803. In some embodiments, the neural network 806 represents the action item prediction model/layer 302 of FIG. 3.

In response to receiving indication of a user selection of the user interface element 805, embodiments (e.g., presentation component 220) can cause display of the window 809. In response to receiving an indication that the "it's hard to understand this" text was selected (representing the "negative feedback" 808 as illustrated in FIG. 8B), the selection is then run through the neural network 802 (which can be any machine learning model) such that embodiments can be tuned or otherwise learn this for future predictions 804. For example, in response to this selection, embodiments (e.g., the presentation component 220) may cause the action item 801 to be removed from display or be modified in some way, such as adding or replacing information (e.g., name of action item owner, name of speaker, due date of action item, what action item really is, and the like). Such modification can occur during a same session the action item 801 was originally displayed or for future sessions. Alternatively or additionally, any future similar action item candidates can be scored with a lower clarity score based on the selection of element 805.

In similar fashion, in response to receiving indication of a user selection of the user interface element 803 (representing the "positive feedback" 810 as illustrated in FIG. 8B), embodiments (e.g., presentation component 220) can run the selection through the neural network 802 such that embodiments can be tuned or otherwise learn this for future predictions 804. The positive feedback 810 is indicative of the user indicating that action item is not hard to understand. For example, in response to this selection, embodiments (e.g., the presentation component 220) may cause the action item 801 to be kept for display or otherwise be highlighted indicating that it is a clearly stated action item (e.g., in a current session or future sessions). Alternatively or additionally, any future similar action item candidates can be scored toward a higher clarity score based on the selection of the element 803. In some embodiments, the neural network 802 represents the clarity model(s)/layer(s) 308 of FIG. 3.

Figure 9:
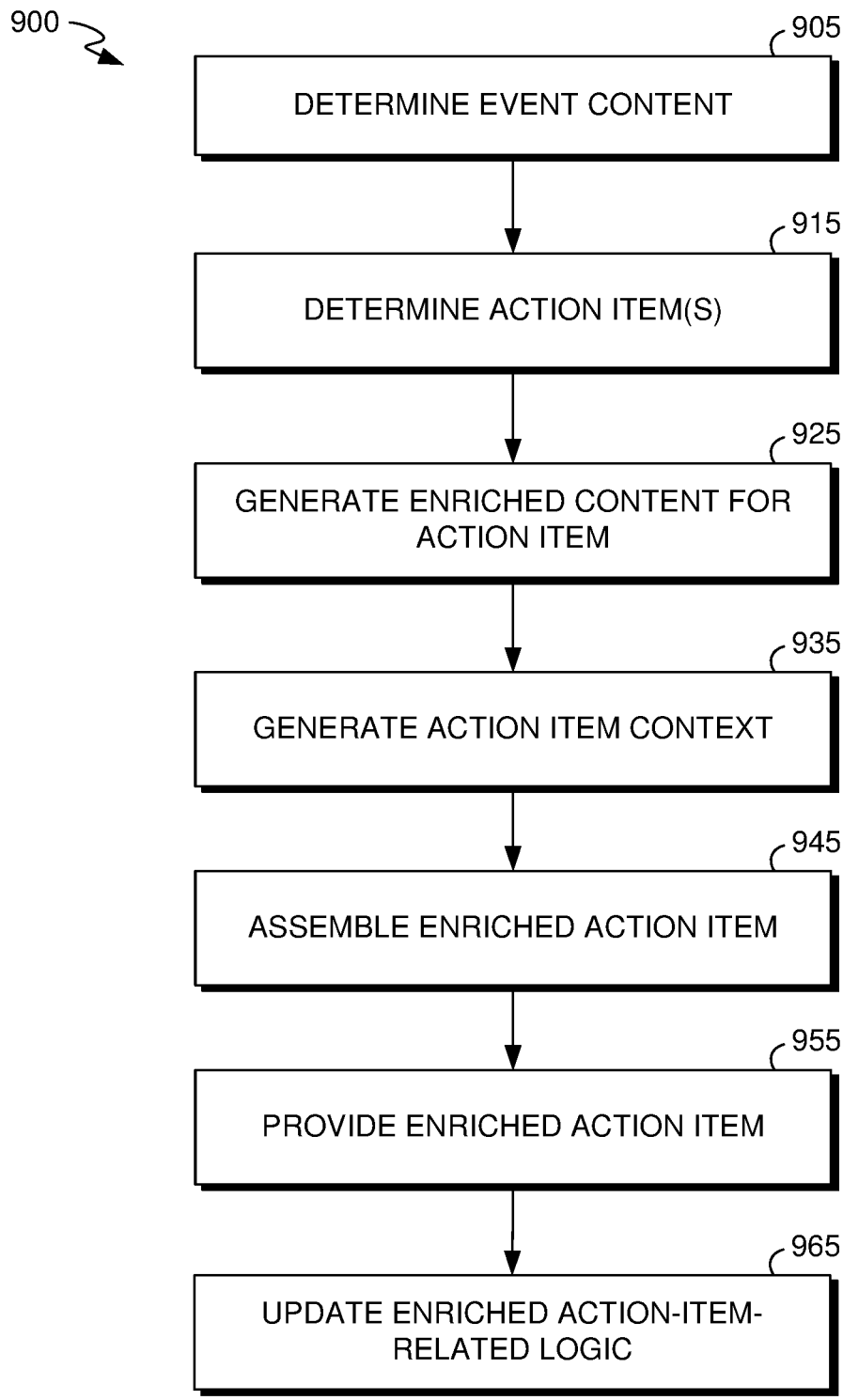
FIG. 9 depicts an example process for generating and providing enriched action items, in accordance with an embodiment.

Turning now to FIG. 9, an example process 900 for providing enriched action items, according to some embodiments. The process 900 (and/or any of the functionality described herein may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments the process 900 does not include block 965. Any added blocks may include blocks that embody any functionality described herein. The computer-implemented method, the system (that includes at least one computing device having at least one processor and at least one computer readable storage medium), and/or the computer storage media as described herein may perform or be caused to perform the processes 900 or any other functionality described herein. In some embodiments, some or each of blocks 905 through 965 may be automated or otherwise occur in a non-manual (e.g., no affirmative user device requests), which improves existing technologies, as described above.

Per block 905, meeting content is determined (e.g., by the meeting monitor 250). For example, the meeting activity monitor 252 can use one or more sensors or other components to monitor chats, presented context, or portions of a transcript. The contextual information extractor/determiner 254 can determine the contextual information of an event, such as who is present or invited to a meeting, the topic of the meeting, location of the meeting, or other context or character sequences within a transcript or meeting content itself. Then the meeting content assembler 256 can generate an enriched meeting-activity timeline, such as tags or structured data that includes a timeline of each conversation and a timestamp indicating when the conversation started/stopped. In certain embodiments of block 905, content is determined from a meeting, which may be determined by monitoring the meeting information about the meeting, such as transcript information, or other information about the meeting such as the attendees, meeting topic, and/or related contextual information. In some embodiments, block 905 comprises monitoring a meeting to determine a set of meeting content. In particular, in one embodiment, a meeting monitor may receive indications of each user input in a chat or other online forum, which is indicative of a live meeting.

Per block 915, a set of action item candidates are determined (e.g., by the action item determiner 260). Embodiments of block 915 determine a set of candidate action item candidates based on meeting content information determined in block 905. For example, based on the conversation and contextual data of a meeting, a set of possible action items may be determined. Some embodiments of step 915 may be performed as described in connection with action item candidate classifier 264 (FIG. 2). In some embodiments of block 530, the meeting content first may be clarified, such as described in connection to meeting content clarifier 261 of FIG. 2. In some embodiments of block 530, an action item candidate can then be identified via the action item candidate identifier 262 of FIG. 2, and then determined via the action item candidate classifier 264. In some embodiments, additional details of step 520 are described in connection to action item determiner 260 in FIG. 2. In some embodiments, action items determined at block 915 can include candidate action items (e.g., as determined by the action item determiner 260 and/or enriched action item generator 280). In some embodiments, the determining of action item candidates can be done using the logic 230 (e.g., via CNN or other machine learning models) within the storage 225.

Per block 925, enriched content for action items is generated. For example, information such as who is responsible for completing the action item, due date of the action item, who is the speaker of the action item, and what the action item is specifically referring to is generated. In some embodiments, block 925 is performed by the action item enrichment 282 of FIG. 2 such that the boundaries of action items can be determined and/or clarity scores and associated information can be generated as described with respect to FIG. 2. In some embodiments, the generating of enriched content for action items can be done using the enrichment logic 239 (e.g., via one or more machine learning models) within the storage 225.

Per block 935, action item context is generated. In some embodiments, the context generated in block 935 is any contextual data, such as event context that the action item is embedded in or otherwise associated with. For example, referring back to FIG. 4, a particular quantity of the pre-event context 402 and the post-event context 406 can be generated in preparation for display. In some embodiments the generated action item context occurs via the action item context generator 286, as described above with respect to FIG. 2.

Per block 945, enriched action items are assembled (e.g., by the enriched action item assembler 288). For example, not only may action items be assembled, but the specific quantity of context (e.g., as determined by the action item context generator 286), the particular bounds of action items (e.g., as determined by the action item boundary generator 283), and/or various missing or unclear information (e.g., as determined by the action item clarifier 285), such as the owner/speaker of the action item, the due date of the action item, and the like. For example, the enriched action item can be assembled in a structured or tagged format that includes or is replaced by the data described above (e.g., action item owner/speaker).

Per block 955, the enriched action item can be provided. In some embodiments, providing the action item includes generating, on a user interface or other displayed format, the assembled enriched action item per block 945. For example, block 955 can include generating similar user interfaces (or data within the user interfaces) with respect to FIG. 4, FIG. 5A, FIG. 5B, FIG. 5C, FIG. 6, FIG. 7, and/or FIG. 8A. For example, an action item with its appropriately highlighted boundaries can be provided in a list of action items, along with selectable features allowing users to expand or minimize the quantity of viewable event context or provide feedback. In some embodiments, the providing of the enriched action item per block 955 is performed via the presentation component 220 of FIG. 2.

Per block 965, particular embodiments update enriched action item-related logic. In some embodiments, block 965 occurs based on receiving user feedback. For example, subsequent to the providing an enriched action item per block 955, a user can view the displayed enriched action item and determine that it is actually not an action item and/or that aspects of the displayed action item are still unclear (e.g., owner/speaker, due date, and the like). Accordingly, embodiments can receive a user selection indicative of this feedback and use the data to update the enriched action items. In some embodiments, the updating occurs in near-real-time, such that this information is updated in the background during a same session that the enriched action items were initially provided. In some embodiments, the updating alternatively or additionally occurs in subsequent sessions. In some embodiments, the feedback issued by users is used by one or more machine learning models (e.g., the enrichment logic 239 and/or the action item identification logic 230) as training or tuning data in order to make subsequent predictions more accurate. For example, in some embodiments the feedback can represent the feedback 310 that is provided back to the action item prediction model/layer 302 and the clarity model(s)/layer(s) 308 of FIG. 3. In some embodiments, block 965 includes the functionality as described with respect to the feedback handler 270 of FIG. 2.

Figure 10:
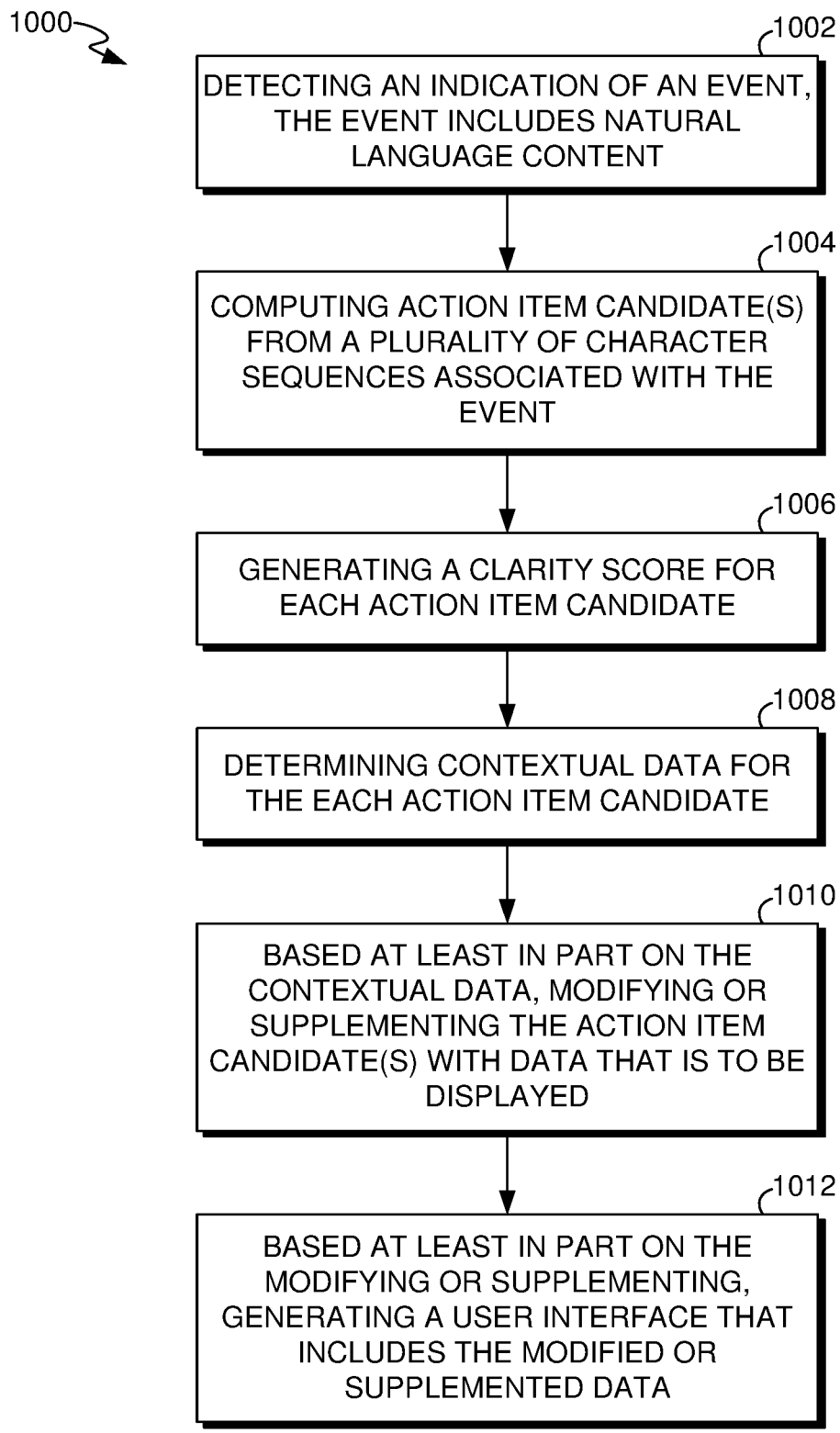
FIG. 10 depicts an example process for generating and presenting action items via a user interface, in accordance with an embodiment.

Turning now to FIG. 10, an example process 1000 for generating a user interface, according to some embodiments. The process 1000 (and/or any of the functionality described herein may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments the process 1000 does not include blocks 1006 and/or 1008. Any added blocks may include blocks that embody any functionality described herein. The computer-implemented method, the system (that includes at least one computing device having at least one processor and at least one computer readable storage medium), and/or the computer storage media as described herein may perform or be caused to perform the processes 1000 or any other functionality described herein. In some embodiments, some or each of blocks 1004 through 1012 may be automated or otherwise occur in a non-manual (e.g., no affirmative user device requests), which improves existing technologies, as described above.

Per block 1002, and indication of an event or one or more portions of an event are detected (e.g., by the meeting monitor 250). The event includes natural language content provided (e.g., spoken or typed) in the meeting event by one or more event participants or attendees. For example, the event can be a meeting of 3 participants and a portion of the meeting event that can be detected is the opening remarks by a first participant. In some embodiments, one or more user devices, sensors, or other devices are queried (e.g., by the meeting monitor 250) to determine that a meeting has or will begin, which may be an indication of an event. Accordingly, when a meeting participant starts engaging in discussion or when a time is identified at which point a meeting will begin, this indication of the event can be detected in near-real-time. For example, using contextual data from calendars, texts, or other data, it can be determined that a meeting will start at 4 p.m. Accordingly, the meeting monitor 250 can, for example, cause a control signal to be sent to a microphone device in proximity of the meeting location or online to become activated, at which point a meeting event is detected or will be detected in response to receiving the first utterances of meeting participants of a meeting. In some embodiments, detecting an "indication" of event includes detecting when it is to start. Alternatively or additionally, detecting an indication of an event can include detecting at least a portion of the event or transcription of the event (e.g., detecting when a person makes an utterance to start the meeting).

In some embodiments, an entire transcript or copy of the event can be detected when the event is completed. For example, a device may record an entire meeting event and an administrator can upload the meeting event on a computing device, which causes a natural language text to be outputted (e.g., via speech-to-text) at which point the transcript can be detected. For illustration purposes and examples described below, an entire example transcript of a meeting event can be the following: " . . . how was your weekend. Great . . . we went fishing. Looks like Bob is arriving. Ok, let's begin, as you recall we talked about sales figures last meeting. We did ok this quarter but we need to do more. John, how did your business unit do? We did fair, with a profit of X. We definitely need to improve. Set a goal for [telephone rings, pause] set a goal for X amount in profit next quarter. Ok. Jake, did we ever call the event coordinator? Yes, but I have not got a hold of him. Okay, give him a text this time. Sometimes he doesn't answer his phone. Actually, I'll text him right now. Jake, before I forget, my daughter also needs to be picked up from school. Can you do that? Yes."

Per block 1004, a set of action item candidates can be determined (e.g., by the action item candidate classifier 264). Some embodiments can compute a set of action item candidates from a plurality of character sequences associated with the event. An action item can be a task indicated in the meeting event that is requested to be completed to further a particular goal or purpose associated with the meeting event. In some embodiments, block 1004 includes tokenizing, via natural language processing, a transcript of the meeting event to clean or otherwise provide insight for prediction action items (e.g., by the meeting content clarifier 261). Tokenizing can include generating Part-of-Speech tags for the plurality of character sequences. For example, using the example transcript above each word can be parsed and tagged with POS identifiers (e.g., "how [interrogative pronoun] was [verb] your [pronoun] weekend [noun]"). In this way, syntax or other phrase structure can be used to identify action item candidates. For example, the typical syntax of an English imperative sentence uses a base verb at the beginning of the sentence with no subject. Accordingly, in the example transcript, the only sentences or phrases that take on a similar structure may be "Okay, give him a text this time" and "set a goal for [telephone rings, pause] set a goal for X amount in profit next quarter," "Actually, I'll text him right now. Jake, before I forget, my daughter also needs to be picked up from school. Can you do that . . . " which may be all be identified as the candidates.

In some embodiments, block 1004 additionally or alternatively includes excluding (e.g., by the action item candidate identifier 262) action item candidates that are likely to be completed during the meeting event and/or excluding action item candidates that are commands or requests that are unrelated to the meeting event. For example, in the example transcript, "actually, I'll text him right now" can be excluded because it is likely to be completed during the meeting. Also, "can you [pick up my daughter from school]" can also be excluded since it is unrelated to the meeting.

In some embodiments, block 1004 additionally or alternatively includes excluding language from action item candidates that is repetitive or redundant. For example, using the example transcript above, "Set a goal for [telephone rings, pause] set a goal for X amount in profit next quarter" can be modified as "PERSON will try to sell X amount in profit next quarter" to remove "set a goal" since it was stated twice. In some embodiments, block 1004 includes processing character sequences of the transcript through a word embedding vector model or semantic model. The word embedding vector model changes natural language characters to numerical vectors that represent input into a machine learning model (e.g., as described with respect to FIG. 4). In this way, the vectors can act as input into a machine learning model. Semantic models, such as Word2Vec can include restructuring the set of action item candidates by removing, adding, or replacing particular words. The restructuring is indicative of clarifying what an action item candidate is. In this way, language is cleaned or otherwise added, removed, or replaced based on semantic context. For example, using the example transcript, "Set a goal for [telephone rings, pause] set a goal for X amount in profit next quarter" can be modified as "PERSON will try to sell X amount in profit next quarter." This restructuring can be completed in various embodiments for all text (or only the identified action item candidates) of the example transcript described above to clean the text. As described above, in some embodiments, the restructuring is based on using a natural language processing component to identify POS tags and semantic context and restructuring the set of action items based at least in part on the POS tags and the semantic context.

Per block 1006, a clarity score for each action item candidate is generated (e.g., by the action item clarifier 285). In some embodiments, the clarity score is at least partially indicative of an amount of missing or incomplete information within each action item candidate. In some embodiments, block 1006 can alternatively be determining missing or incomplete information associated with each action item candidate. In some embodiments block 1006 includes or is preceded/succeeded by computing boundaries of one or more action item candidate, which includes determining a beginning word of the one or more action item candidates and determining and ending word of the one or more action item candidates. For example, using the example action item candidate above from the example transcript, for the "Okay, give him a text this time" candidate, the beginning boundary can be "give" and the ending boundary can be "time." This can be used to highlight or otherwise generate a user interface that includes the boundaries and all characters in between the boundaries so that the action item candidate, for example, can be displayed as "give him a text this time." In this way, for example, the user interface can include text that is not highlighted that does not represent the action item candidate and text that is highlighted that represents the boundaries of the action item candidate (and the words in between the boundaries). For example, referring back to FIG. 5B, the action item 504-2 is highlighted, while the other event context 504-1 is not highlighted.

In some embodiments, the computing of action item boundaries is based at least in part on running the one or more action item candidates through one or more machine learning models. For example, the candidates can be run through a beginning/end model/layer 306 as described with respect to FIG. 3 or similar models described with respect to the action item clarifier 285 of FIG. 2.

In some embodiments, determining missing or incomplete information includes determining that a first event participant responsible for completing an action item candidate is missing in an action item candidate or determining that the first meeting participant responsible for stating the action item candidate is missing in the action item candidate, such that the modifying or supplementing at block 1012 includes providing a name or identifier of the first event participant. For example, in the action item candidate "give him a text this time," it may be unclear who said this and who owns it. Accordingly, this action item may be supplemented with names that made this statement and who needs to complete it. Similar examples and embodiments are described with respect to the action item enrichment 282 of FIG. 2 and FIG. 4.

In some embodiments, the determining missing or incomplete information includes determining that a first action item candidate is not directly stated such that the modifying or supplementing at block 1012 includes clarifying what the action item candidate is. For example, using the action item candidate, "give him a text this time," it may be unclear what information the text is supposed to include. Accordingly, this action item candidate can, for example, include the following information "give him [event coordinator] a text [asking whether the building is available tomorrow]." Other examples are described with respect to the clarity model(s) 308, FIG. 4, and the action item enrichment 282.

In some embodiments, the clarity score or other clarity determination associated with block 1006 is based at least in part on external context and event context. For example, using the illustration above the character sequences "event coordinator" in the action item candidate "give him [event coordinator] a text [asking whether the building is available tomorrow]" may have been derived from the pre-event context of the example transcript that shows that discussion involved the event coordinator. In an another example, the "asking whether the building is available" tomorrow may have come from the external context of a text on a user device, email, social media, or any other channel that is not the example transcript. Other examples of block 906 are described with respect to FIG. 4, for example.

Per block 1008, contextual data for each action item candidate is determined (e.g., by the action item context generator 286). In some embodiments, the contextual data includes at least a portion of the plurality of character sequences that are not each action candidate. For example, referring back to FIG. 4, the character sequences that are not the action item candidate 404 is the pre-event context 402 (including the character sequence 402-1) and the post-event context 406 (including the character sequence 406-1).

In some embodiments, the contextual data includes at least one of event context and external context. The external context is not part of the plurality of character sequences (e.g., a meeting transcript, meeting chat) and is not uttered or written within the meeting event. Put another way, the external context includes data derived from outside of a transcript. For example, the external contextual data can include texts from user devices, data from social media accounts, data within emails, data within calendars, and/or data from files, all of which may not directly be a meeting transcript or actual content that was stated/input by users at an event.

In some embodiments, the event context can include a portion of a transcript that is not a particular action item candidate. In some embodiments, the event context can include a first set of character sequences before each action item candidate within the transcript and other character sequences after each action item candidate. For example, referring back to FIG. 4, this may include the pre-event context 402 and the post-event context 406. In this way, the event context can also include a portion of the transcript that is not a particular action item candidate. In some embodiments, the first set of character sequences and the other character sequences are processed in parallel (e.g., at substantially the same time) in order to generate a clarity score. For example, a BERT model can be used to do this.

Per block 1010, based at least in part on the contextual data, modifying or supplementing the action item candidates with data that is to be displayed. In some embodiments, this includes clarifying the one or more action item candidates by at least supplementing information, removing information, or replacing information associated with each action item candidate. For example, "supplementing" information may include supplementing the action item candidate "give him a text" with "action item owner: Jack . . . action item: text asking whether building is available" so as to indicate who owns the action item and clearly stating what the action item is. In some embodiments, removing information can include removing words or other character sequences from the action item candidate, such as removing the word "actually" in the character sequence, "Actually, I'll text him right now" to better indicate what the action item boundaries are. In some embodiments, replacing information includes replacing words or character sequences within action item candidates with other words or character sequences. For example, for the action item candidate "give him a text," the new replacement can be "give [event coordinator] a text [asking whether the building is available tomorrow]," where "him" is replaced by event coordinator. Such supplementing, removing, or replacing can occur with respect to any feature needing clarity, such as who stated an action item, the due date of the action item, what the action item really is, and/or who owns the action item.

In various embodiments, block 1010 includes modifying or supplementing the one or more action item candidates with data that at least partially completes or at least partially clarifies missing or incomplete information within (or outside of or associated with) each action item candidate. Such examples are described above with respect to the "give him a text" examples of supplementing, removing, or replacing. This is further described with respect to the action item enrichment 282 of FIG. 2 and FIG. 4's description of what the "we should do it" phrase corresponds to in terms of owner, speaker, action item, and date. In some embodiments, the modifying or the supplementing of the one or more action item candidates with data includes determining which meeting event participant is responsible for completing an action item candidate or determining which meeting event participant is responsible for stating the action item candidate and causing display (at block 1012) indicia indicating the meeting event participant. This is also referred to herein as the owner and speaker of the action item respectively. In some embodiments, the modifying or supplementing the one or more action item candidates with data includes determining that a due date for an action item candidate is missing, determining the due date, and causing display (at block 1012) within a user interface, indicia indicating the due date.

Per block 1012, based at least in part on the modifying or supplementing, a user interface is generated (e.g., by the presentation component 220), which includes the modified or supplemented data. In some embodiments, block 1012 includes causing display within the user interface of a computing device of the supplemented information, the information that has not been removed, and/or the replaced information based at least in part on the supplementing information, removing information, or replacing information associated with each action item candidate as described above. For example, the new replacement candidate "give [event coordinator] a text [asking whether the building is available tomorrow]," can be generated within the user interface such that "him" is replaced by "event coordinator" and "him" is thus not generated within the user interface. In this example, the supplemented information "asking whether the building is available tomorrow" is generated within the user interface. Information that has not been removed is, for example, "give . . . a text . . . " and the replaced information is "event coordinator."

In some embodiments, block 1012 can be preceded by determining (e.g., by the action item context generator 286) an amount of event context to display within the user interface based at least in part on the clarity score. Consequently, block 912 can include generating the particular amount of context within the user interface, as described, for example, with respect to FIG. 7 and FIG. 6.

In some embodiments, an indication of a selection on a user device can be received (e.g., by the feedback handler 270). The selection is indicative of a user of the user device not understanding at least a portion of an action item candidate. Based on the selection, a machine learning model can be trained. In some embodiments, the training includes modifying the clarity score. These embodiments are described with respect to examples illustrated in FIG. 8A, 8B, FIG. 7, FIG. 5C, FIG. 6, and the feedback 310 of FIG. 3.

In some embodiments, the user interface includes a particular amount of event context to display within the user interface. The event context can include all of the content within a transcript. These embodiments are described with respect to examples illustrated in FIG. 8A, 8B, FIG. 7, FIG. 5C, FIG. 6, and the feedback 310 of FIG. 3. In some embodiments, a component (e.g., the context generator 27) can cause an adjustment in the amount of context to display in response to a user selection of an element within the user interface. Examples of this are described with respect to the elements 702 and 704 of FIG. 7 or elements 516 and 518 of FIG. 5.

In some embodiments, a component (e.g., the presentation component 220) may receive an indication of a selection of an element within the user interface that is indicative of only displaying the action items. Responsively, only the action items may be displayed. For example, referring back to FIG. 5B, in response to a selection of the user interface element 502, a list of action items are displayed. In some embodiments, a particular portion of event context is caused to be displayed based at least in part on the clarity score (block 906) of the one or more action items. For example, if the clarity score is above a threshold, a smaller amount of event context is displayed relative to if the clarity score is below the threshold. This is described, for example, with respect to the clarity scores for the action items 710 and 706 of FIG. 7. In some embodiments, a component (e.g., the feedback handler 270) receives user feedback indicative of notes or other information to provide more clarity for the one or more action items. Examples of this may occur in response to selection of the user interface elements 718 of FIG. 7 or 614 of FIG. 6.

Figure 11:
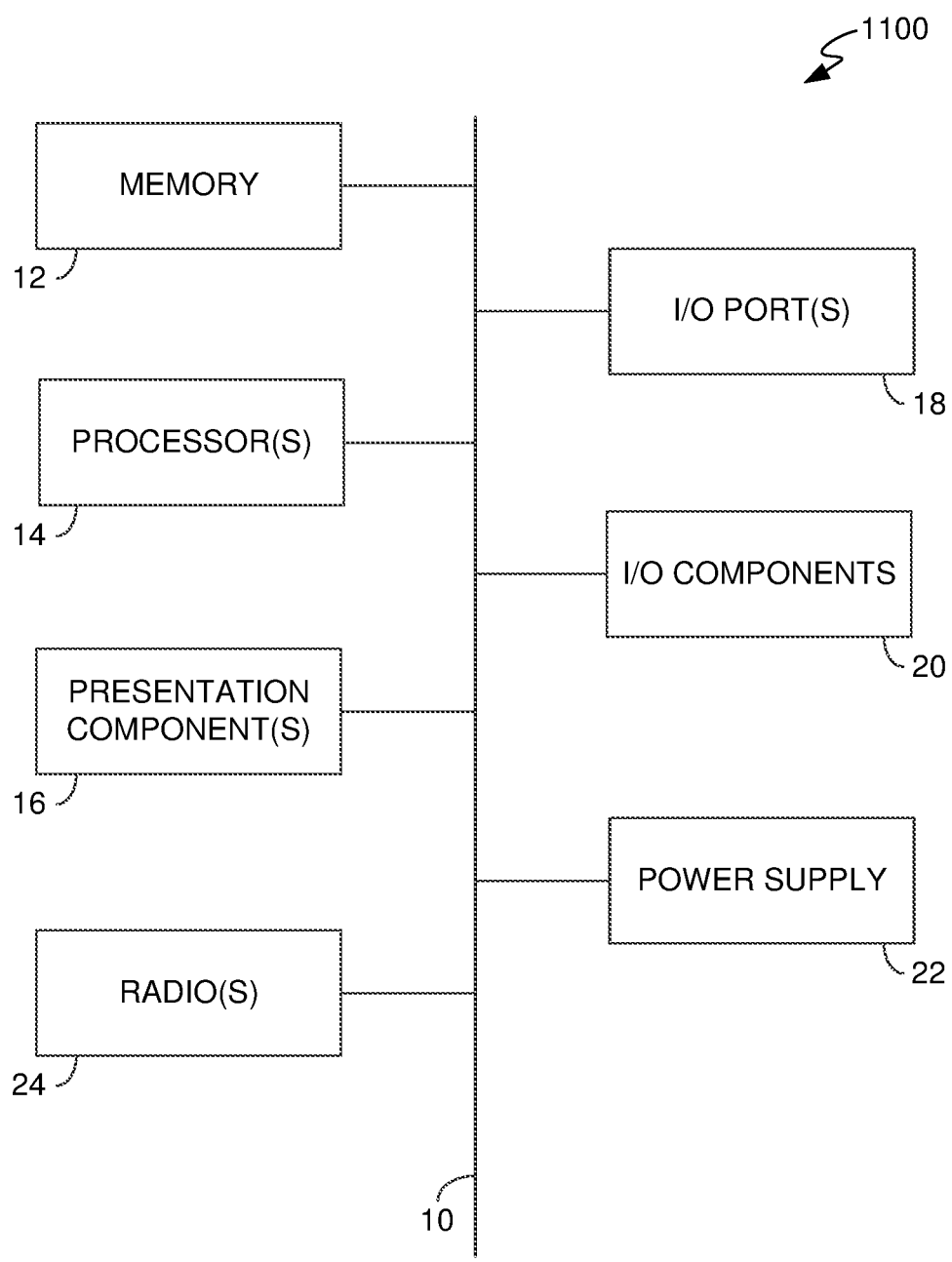
FIG. 11 is a block diagram of an exemplary computing device for use in implementing an embodiment of the present disclosure.

Having described various implementations, an exemplary computing environment suitable for implementing embodiments of the disclosure is now described. With reference to FIG. 11, an exemplary computing device is provided and referred to generally as computing device 1100. The computing device 1100 is but one example of a suitable computing environment and is not intended to suggest any limitation as to the scope of use or functionality of embodiments of the disclosure. Neither should the computing device 1100 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 11, computing device 1100 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 14 that read data from various entities such as memory 12 or I/O components 20. Presentation component(s) 16 presents data indications to a user or other device. In some implementations presentation component 220 of system 200 may be embodied as a presentation component 16. Other examples of presentation components may include a display device, speaker, printing component, vibrating component, and the like.

The I/O ports 18 allow computing device 1100 to be logically coupled to other devices, including I/O components 620, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some embodiments of computing device 1100 may include one or more radio(s) 24 (or similar wireless communication components). The radio 24 transmits and receives radio or wireless communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and subcombinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computerized system comprising: one or more processors; and computer storage memory having computer-executable instructions stored thereon which, when executed by the one or more processors, implement a method comprising: detecting an indication of a meeting event, the meeting event includes natural language content provided in the meeting event by one or more meeting participants; computing or determining one or more action items from a plurality of character sequences associated with the natural language content, wherein an action item is a task indicated in the meeting event that is requested to be completed to further a particular goal or purpose associated with the meeting event; generating a clarity score for each action item of the one or more action items, the clarity score is at least partially indicative of an amount of missing or incomplete information within the each action item; determining contextual data for the each action item, the contextual data including at least a portion of the plurality of character sequences that are not the each action item; based at least in part on the determining of the contextual data, modifying or supplementing the one or more action items with data that at least partially completes or at least partially clarifies the missing or incomplete information within the each action item; and based at least in part on the modifying or supplementing of the one or more action items with the data, generating a user interface that displays the modified or supplemented data in association with the one or more action items.

Clause 2. The system of clause 1, wherein the contextual data includes external contextual data that is not a part of the plurality of character sequences and is not uttered or written within the meeting event.

Clause 3. The system of clause 1, the method further comprising computing boundaries of the one or more action items, wherein the computing includes determining a beginning word of the one or more action items and determining an ending word of the one or more action items.

Clause 4. The system of clause 1, wherein the modifying or supplementing the one or more action items with data includes determining which meeting event participant is responsible for completing an action item or determining which meeting event participant is responsible for stating the action item and generating, within the user interface, indicia indicating the meeting event participant.

Clause 5. The system of clause 1, wherein the modifying or supplementing the one or more action items with data includes determining that a due date for an action item is missing, determining the due date, and causing display, within the user interface, indicia indicating the due date.

Clause 6. The system of clause 1, the method further comprising determining an amount of event context to display within the user interface based at least in part on the clarity score, wherein the event context includes a transcript of the meeting event.

Clause 7. The system of claim 1, the method further comprising: receiving an indication of a selection on a user device, the selection is indicative of a user of the user device not understanding at least a portion of an action item; and based on the selection, training a machine learning model, wherein the training includes modifying the clarity score for the action item or subsequent action item.

Clause 8. A computer-implemented method comprising: detecting an indication of an event, the event includes natural language content provided in the event by one or more event participants; computing one or more action item candidates among a transcript of character sequences associated with the event, wherein an action item is a task indicated in the event that is requested to be completed to further a particular goal or purpose associated with the event; determining missing or incomplete information associated with each action item candidate; determining contextual data for the each action item candidate, the contextual data including at least one of: event context and external context, the event context includes at least a portion of the transcript that is not the each action item candidate, the external context includes data derived from outside of the transcript; based at least in part on the determining of the contextual data, modifying or supplementing the one or more action item candidates with data that at least partially completes or at least partially clarifies the missing or incomplete information within the each action item candidate; and based on the modifying or the supplementing the one or more action item candidates with the data, causing presentation of the modified or supplemented data.

Clause 9. The method of clause 8, wherein the event context includes a first set of character sequences before the each action item candidate within the transcript and other character sequences after the each action item candidate, wherein the first set of character sequences and the other character sequences are processed in parallel to generate a clarity score.

Clause 10. The method of clause 8, further comprising computing boundaries of the one or more action item candidates based at least in part on running the one or more action item candidates through one or more machine learning models.

Clause 11. The method of clause 8, wherein the determining missing or incomplete information includes determining that a first event participant responsible for completing an action item candidate is missing in an action item candidate or determining that the first event participant responsible for stating the action item candidate is missing in the action item candidate, and wherein the modifying or supplementing includes providing a name or identifier of the first event participant.

Clause 12. The method of clause 8, wherein the determining missing or incomplete information includes determining that a first action item candidate is not directly stated, and wherein the modifying or supplementing includes clarifying what the action item candidate is.

Clause 13. The method of clause 8, further comprising causing display of a particular amount of event context to display within the user interface, the event context includes all of the content within the transcript.

Clause 14. The method of clause 13, further comprising causing an adjustment in the amount of event context to display in response to a user selection of an element within the user interface.

Clause 15. One or more computer storage media having computer-executable instructions embodied thereon that, when executed, by one or more processors, cause the one or more processors to perform a method, the method comprising: detecting an indication of an event, the event includes natural language content provided in the event by one or more event participants; determining one or more action item candidates among a plurality of character sequences of the natural language content, wherein an action item is a task indicated in the event that is requested to be completed to further a particular goal or purpose associated with the event; clarifying the one or more action item candidates by at least supplementing information, removing information, or replacing information associated with each action item candidate; and based at least in part on the supplementing information, removing information, or replacing information associated with each action item candidate, causing display within a user interface of a computing device of: the supplemented information, the information that has not been removed, or the replaced information.

Clause 16. The computer storage media of clause 15, wherein the clarifying of the one or more action item candidates is based at least in part on external context and event context.

Clause 17. The computer storage media of clause 15, wherein the clarifying of the one or more action item candidates includes highlighting boundaries of the action item candidate such that the user interface includes text that is not highlighted that does not represent the action item candidate and text that is highlighted that represents the boundaries of the action item candidate.

Clause 18. The computer storage media of clause 15, the method further comprising receiving an indication of a selection of an element within the user interface that is indicative of only displaying the action items.

Clause 19. The computer storage media of clause 15, the method further comprising causing display of a particular portion of event context based at least in part on a clarity score of the one or more action item candidates.

Clause 20. The computer storage media of clause 15, the method further comprising receiving user feedback indicative of notes or other information to provide more clarity for the one or more action items.

What is claimed is:

1. A computerized system comprising:
   one or more processors; and
   computer storage memory having computer-executable instructions stored thereon which, when executed by the one or more processors, implement a method comprising:
   detecting an indication of a meeting event, wherein the meeting event includes natural language content provided in the meeting event by one or more meeting participants;
   determining one or more action items from a plurality of character sequences associated with the natural language content, wherein an action item is a task indicated in the meeting event that is requested, by a meeting participant of the one or more meeting participants, to be completed to further a particular goal or purpose associated with the meeting event;
   generating a clarity score for each action item of the one or more action items, wherein the clarity score is at least partially indicative of an amount of missing or incomplete information within the each action item;
   determining contextual data for the each action item, the contextual data including at least a portion of the plurality of character sequences that are not the each action item;
   based at least in part on the generating of the clarity score and the determining of the contextual data, modifying or supplementing the one or more action items with data that at least partially completes or at least partially clarifies the missing or incomplete information within the each action item; and
   based at least in part on the modifying or supplementing of the one or more action items with the data, generating a user interface that displays the modified or supplemented data in association with the one or more action items.

2. The system of claim 1, wherein the contextual data includes external contextual data that is not a part of the plurality of character sequences and is not uttered or written during the meeting event.

3. The system of claim 1, the method further comprising computing boundaries of the one or more action items, wherein the computing includes determining a beginning word of each of the one or more action items and determining an ending word of the each of the one or more action items.

4. The system of claim 1, wherein the modifying or supplementing the one or more action items with data includes determining which meeting event participant is responsible for completing an action item or determining which meeting event participant is responsible for stating the action item and generating, within the user interface, indicia indicating the meeting event participant.

5. The system of claim 1, wherein the modifying or supplementing the one or more action items with data includes determining that a due date for an action item is missing, determining the due date, and causing display, within the user interface, indicia indicating the due date.

6. The system of claim 1, the method further comprising determining an amount of event context to display within the user interface based at least in part on the clarity score, wherein the event context includes a transcript of the meeting event.

7. The system of claim 1, the method further comprising:
   receiving an indication of a selection on a user device, wherein the selection is indicative of a user of the user device not understanding at least a portion of an action item; and
   based on the selection, training a machine learning model, wherein the training includes modifying the clarity score for the action item or subsequent action item.

8. A computer-implemented method comprising:
   detecting an indication of an event, wherein the event includes natural language content provided in the event by one or more event participants;
   computing one or more action item candidates among a transcript of character sequences associated with the event, wherein an action item is a task indicated in the event that is requested, by an event participant of the one or more event participants, to be completed to further a particular goal or purpose associated with the event;
   determining missing or incomplete information within each action item candidate;
   determining contextual data for the each action item candidate, the contextual data including at least one of: event context and external context, wherein the event context includes at least a portion of the transcript that is not the each action item candidate, and wherein the external context includes data derived from outside of the transcript;

based at least in part on the determining the missing or complete information and the determining of the contextual data, modifying or supplementing the one or more action item candidates with data that at least partially completes or at least partially clarifies the missing or incomplete information within the each action item candidate; and based on the modifying or the supplementing the one or more action item candidates with the data, causing presentation of the modified or supplemented data.

9. The method of claim 8, wherein the event context includes a first set of character sequences before the each action item candidate within the transcript and other character sequences after the each action item candidate, wherein the first set of character sequences and the other character sequences are processed in parallel to generate a clarity score.

10. The method of claim 8, further comprising computing boundaries of the one or more action item candidates based at least in part on running the one or more action item candidates through one or more machine learning models.

11. The method of claim 8, wherein the determining missing or incomplete information includes determining that a first event participant responsible for completing an action item candidate is missing in an action item candidate or determining that the first event participant responsible for stating the action item candidate is missing in the action item candidate, and wherein the modifying or supplementing includes providing a name or identifier of the first event participant.

12. The method of claim 8, wherein the determining missing or incomplete information includes determining that a first action item candidate is not directly stated, and wherein the modifying or supplementing includes clarifying what the action item candidate is.

13. The method of claim 8, further comprising causing display of a particular amount of event context to display within the user interface, wherein the event context includes all of the content within the transcript.

14. The method of claim 8, further comprising causing an adjustment in the amount of event context to display in response to a user selection of an element within the user interface.

15. One or more computer storage media having computer-executable instructions embodied thereon that, when executed, by one or more processors, cause the one or more processors to perform a method, the method comprising:

detecting an indication of an event, wherein the event includes natural language content provided in the event by one or more event participants;

determining one or more action item candidates among a plurality of character sequences of the natural language content, wherein an action item is a task indicated in the event that is requested, by an event participant of the one or more event ap to be completed to further a particular goal or purpose associated with the event;

clarifying the one or more action item candidates by at least supplementing information, removing information, or replacing information within the one or more item candidates; and based at least in part on the supplementing information, removing information, or replacing information within the one or more action item candidates, causing display within a user interface of a computing device of: the supplemented information, the information that has not been removed, or the replaced information.

16. The computer storage media of claim 15, wherein the clarifying of the one or more action item candidates is based at least in part on external context and event context.

17. The computer storage media of claim 15, wherein the clarifying of the one or more action item candidates includes highlighting boundaries of the action item candidate such that the user interface includes text that is not highlighted that does not represent the action item candidate and text that is highlighted that represents the boundaries of the action item candidate.

18. The computer storage media of claim 15, the method further comprising receiving an indication of a selection of an element within the user interface that is indicative of only displaying the action items.

19. The computer storage media of claim 15, the method further comprising causing display of a particular portion of event context based at least in part on a clarity score of the one or more action item candidates.

20. The computer storage media of claim 15, the method further comprising receiving user feedback indicative of notes or other information to provide more clarity for the one or more action items.

* * * * *